(12) United States Patent
Ishibashi

(10) Patent No.: US 8,189,265 B2
(45) Date of Patent: May 29, 2012

(54) OPTICAL ELEMENT HAVING REFRACTIVE INDEX DISTRIBUTION AND OPTICAL APPARATUS

(75) Inventor: Tomohiko Ishibashi, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 58 days.

(21) Appl. No.: 12/889,036

(22) Filed: Sep. 23, 2010

(65) Prior Publication Data

US 2011/0075268 A1 Mar. 31, 2011

(30) Foreign Application Priority Data

Sep. 25, 2009 (JP) .................................. 2009-221630

(51) Int. Cl.
*G02B 3/00* (2006.01)

(52) U.S. Cl. ......................... 359/652; 359/653; 359/654

(58) Field of Classification Search ........... 359/652–654
See application file for complete search history.

(56) References Cited

U.S. PATENT DOCUMENTS 5,841,586 A 11/1998 Nagaoka
7,426,079 B2 * 9/2008 Yokoyama ..................... 359/642

FOREIGN PATENT DOCUMENTS

| JP | 2004-212644 A | 7/2004 |
| JP | 2004-240464 A | 8/2004 |
| JP | 3573575 B2 | 10/2004 |

* cited by examiner

*Primary Examiner* — William Choi
(74) *Attorney, Agent, or Firm* — Rossi, Kimms & McDowell LLP

(57) ABSTRACT

An optical element Ggi1 includes a medium that has a refractive index distribution. This optical element satisfies conditions of $|\theta gF(pmax)-\theta gF(pmin)|\geq 0.02$, $|\Delta\theta gFgi(p1)|\geq 0.0272$, $|\Delta\theta gdgi(p1)|\geq 0.0250$, and $|\theta gFgi(pmaxgi)-\theta gFgi(pmingi)|\leq 0.1$.

5 Claims, 12 Drawing Sheets

OPTICAL ELEMENT HAVING REFRACTIVE INDEX DISTRIBUTION AND OPTICAL APPARATUS

BACKGROUND OF THE INVENTION

1. Field of the Invention

The present invention relates to an optical element that includes a medium having a refractive index distribution (refractive index profile).

2. Description of the Related Art

An optical system used for an optical apparatus, such as a digital camera and a video camera, is demanded for a high performance and a small and lightweight configuration. In general, as the optical system becomes smaller, large amounts of a variety of aberrations occur, in particular a large amount of a chromatic aberration occurs, which is represented by an axial chromatic aberration and a lateral chromatic aberration, and its optical performance lowers.

It is difficult for an optical system made of an only optical material, such as known glass, to simultaneously satisfy the high performance and the small and lightweight configuration. Accordingly, one known method corrects (reduces) a variety of aberrations utilizing an optical element whose medium having a refractive index distribution for a part of the optical system.

This optical element having the refractive index distribution provides a higher degree of freedom of an aberrational correction than that of an optical element whose medium has a homogeneous refractive index. Each of Japanese Patent Laid-Open Nos. 2004-212644 and 2004-240464 discloses an optical system that includes an optical element having a refractive index distribution and used to correct a chromatic aberration.

Japanese Patent No. 3,573,575 discloses an optical system that includes a lens having a refractive index distribution in a direction orthogonal to the optical axis and its secondary spectrum is corrected while the dispersion is considered.

A material's characteristic in a shortwave region in the visible light is considered in the optical systems disclosed in Japanese Patent Laid-Open Nos. 2004-212644 and 2004-240464 and Japanese Patent No. 3,573,575, but a wavelength dispersion characteristic of a refraction caused by the refractive index distribution is not fully considered. Assume that an optical element having a refractive index distribution is equivalent to a dioptric optical element having no refractive index distribution, and values of its focal length, Abbe number, and partial distribution ratio are equivalently defined. The wavelength distribution of the refraction caused by the refractive index distribution in this case can be expressed by an equivalently defined Abbe number (which will be referred to as an "equivalent Abbe number" in this specification) and an equivalently defined partial distribution ratio (which will be referred to as an "equivalent partial dispersion ratio" in this specification), etc.

In particular, the secondary spectrum can be well corrected when the distribution characteristic of the refraction caused by the refractive index distribution for rays of four wavelengths including g line (435.8 nm), an F line (486.1 nm), d line (587.6 nm), and C line (656.3 nm).

In addition, Japanese Patent Laid-Open Nos. 2004-212644 and 2004-240464 and Japanese Patent No. 3573575 provide insufficient disclosures about a characteristic of a material etc. used to produce an optical element having a refractive index distribution, or do not clearly disclose a method for producing a target refractive index distribution.

SUMMARY OF THE INVENTION

The present invention provides an optical element having a refractive index distribution that can well correct a variety of aberrations, and an optical apparatus having the same.

An optical element according to the present invention includes a medium that has a refractive index distribution. The following conditions are met:

$$|\theta gF(p\max) - \theta gF(p\min)| \geq 0.02$$

$$|\Delta\theta gFgi(p1)| \geq 0.0272$$

$$|\Delta\theta gdgi(p1)| \geq 0.0250$$

$$|\theta gFi(p\max gi) - \theta gFi(p\min gi)| \leq 0.1$$

where $\theta gF(p\max)$ is a partial dispersion ratio for g line and F line at a position pmax in the medium, $\theta gF(p\min)$ is a partial dispersion ratio for the g line and the F line at a position pmin in the medium, the position pmax in the medium is a position that maximizes the partial dispersion ratio for the g line and the F line, the position pmin in the medium is a position that minimizes the partial dispersion ratio for the g line and the F line.

The following conditions are met:

$$\delta ng(p1) = ng(p1) - ng(p0)$$

$$\delta nd(p1) = nd(p1) - nd(p0)$$

$$\delta nF(p1) = nF(p1) - nF(p0)$$

$$\delta nC(p1) = nC(p1) - nC(p0)$$

$$\theta gFgi(p1) = \{\delta ng(p1) - \delta nF(p1)\}/\{\delta nF(p1) - \delta nC(p1)\}$$

$$\theta gdgi(p1) = \{\delta ng(p1) - \delta nd(p1)\}/\{\delta nF(p1) - \delta nC(p1)\}$$

where P0 is a position in the medium having a reference refractive index, p1 is a position in the medium different from the position p0, nF(p1) is a refractive index of the medium for the F line at the position p1, nd(p1) is a refractive index of the medium for d line at the position p1, nC(p1) is a refractive index of the medium for C line at the position p1, nF(p0) is a refractive index of the medium for the F line at the position p0, nd(p0) is a refractive index of the medium for the d line at the position p0, nC(p0) is a refractive index of the medium for the C line at the position p0, $\delta ng(p1)$ is a refractive index difference for the g line at the position p1, $\delta nF(p1)$ is a refractive index difference for the F line at the position p1, $\delta nd(p1)$ is a refractive index difference for the d line at the position p1, $\delta nC(p1)$ is a refractive index difference for the C line at the position p1, $\theta gFgi(p1)$ is an equivalent partial dispersion ratio for the g line and the F line in the medium at the position p1, and $\theta gdgi(p1)$ is an equivalent partial dispersion ratio for the g line and the d line in the medium at the position p1.

The following conditions are met:

$$\Delta\theta gFgi(p1) = \theta gFgi(p1) - \theta gFgi0$$

$$\Delta\theta gdgi(p1) = \theta gdgi(p1) - \theta gdgi0$$

where $\Delta\theta gFgi(p1)$ is an anomalous dispersion of the equivalent partial dispersion ratio $\theta gFgi(p1)$, $\Delta\theta gdgi(p1)$ is an anomalous dispersion of the equivalent partial dispersion ratio $\theta gdgi(p1)$, vdgi(p1) is an equivalent Abbe number for the d line and the g line at the position p1 in the medium, $\theta gFgi0 = -1.665 \times 10^{-7} vdgi(p1)^3 + 5.213 \times 10^{-5} vdgi(p1)^2 -$ $5.656\times10^{-3}\text{vdgi}(p1)+0.7278$, and $\theta\text{gdgi}0=-1.687\times10^{-7}\text{vdgi}(p1)^3+5.702\times10^{-5}\text{vdgi}(p1)^2-6.603\times10^{-3}\text{vdgi}(p1)+1.462$.

$\theta\text{gFgi}(\text{pmaxgi})$ is the equivalent partial dispersion ratio at a position pmaxgi in the medium, and $\theta\text{gFgi}(\text{pmingi})$ is the equivalent partial dispersion ratio at a position pmingi in the medium. The position pmaxgi is a position that is located in the medium different from the position p0, and maximizes the equivalent partial dispersion ratio for the g line and the F line, and the position pmingi is a position that is located in the medium different from the position p0, and minimizes the equivalent partial dispersion ratio for the g line and the F line.

An optical apparatus including the optical system that includes the above optical element constitutes another aspect of the present invention.

Further features of the present invention will become apparent from the following description of exemplary embodiments with reference to the attached drawings.

DESCRIPTION OF THE EMBODIMENTS

Figure 1:
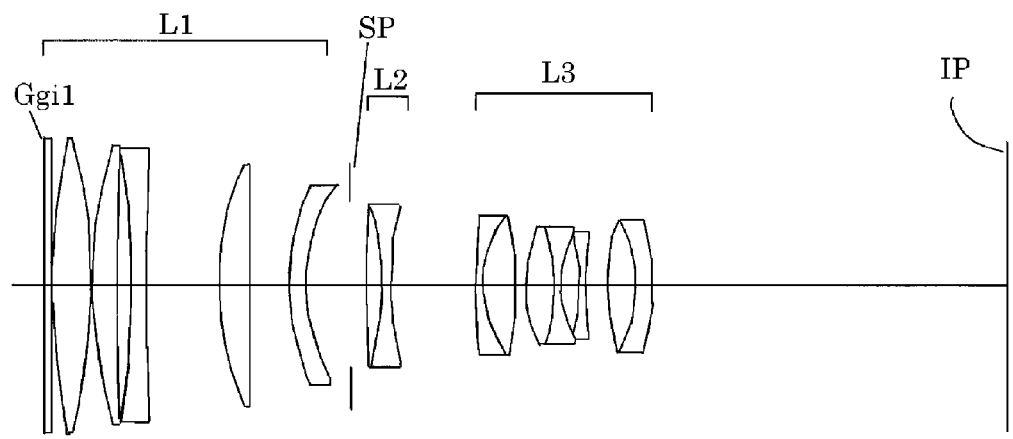
FIG. 1 is a sectional view of an optical system that includes an optical element according to a first embodiment of the present invention.

Referring now to the drawings, a description will be given of embodiments of the present invention.

A description will now be given of common matters to first to tenth embodiments according to the present invention, which will be described later. An optical element of this embodiment has a refractive index distribution in a medium, and the wavelength characteristic of the refractive index distribution satisfies some conditions, which will be described later.

The optical element of this embodiment is applicable to an optical system for an optical apparatus, such as a digital still camera, a film-based camera, a video camera, a telescope, a pair of binoculars, a copier, and a projector.

A "solid-state material" that constitutes the optical element of the embodiment is a material that is solid when it is applied to and used for an optical system. A state of the material before it is used for the optical system, such as at the manufacture time, is not limited. For example, a material that is liquid at the manufacture time is the solid-state material if it is cured into solid.

The optical element of the embodiments provides a phase difference to an incident ray due to its refractive index distribution in the material, converges or diverges the light like a convex lens or a concave lens made of a (homogeneous) material that has no refractive index distribution.

As a type of the refractive index distribution, there are a radial refractive index distribution that has a refractive index distribution in a direction orthogonal to the optical axis, an axial refractive index that has a refractive index distribution in an optical axis direction, etc.

The optical element that has a refractive index distribution refracts a ray in the medium as well as the refraction at the interface. Therefore, it has a higher degree of freedom in the aberrational correction than that of an optical element made of a homogeneous medium.

There are proposed a variety of methods for forming a refractive index distribution in the medium, such as an ion exchange method, a sol-gel process, a three-dimensional printing technology, etc.

The ion exchange method obtains a refractive index distribution by immersing into a solution an ion-containing material that can provide an ion exchange. The sol-gel process compounds sol having silicon as a main ingredient, obtains gel, provides a predetermined refractive index distribution to gel, and acquires a glass material through drying and sintering.

The three-dimensional printing technology molds a plurality of layers of media having different refractive indexes and provides a refractive index distribution.

These methods obtain a refractive index distribution by producing a predetermined composition ratio distribution in a plurality of materials in the medium.

Regarding a wavelength dispersion of the refractive index distribution, when there is a similar refractive index distribution for each wavelength, no chromatic aberration occurs as a refractive component in the medium. However, in distributing a composition ratio among a plurality of materials and producing a refractive index distribution as described above, a refractive index distribution amount for each wavelength or a wavelength dispersion of a refractive index distribution occurs.

A wavelength dispersion of a refractive index distribution in an optical element of the embodiments satisfies the following conditions:

$$|\theta gF(p\max)-\theta gF(p\min)|\geqq 0.02 \quad (1)$$

$$|\Delta\theta gFgi(p1)|\geqq 0.0272 \quad (2)$$

$$|\Delta\theta gdgi(p1)|\geqq 0.0250 \quad (3)$$

$$|\theta gFgi(p\max gi)|\theta gFgi(p\min gi)|\leqq 0.1 \quad (4)$$

Here, assume that $n\lambda(p)$ is a refractive index to a ray having a wavelength $\lambda$ at a position p in a medium. Pursuant to this definition, the refractive indexes for the g line (435.8 nm), the F line (486.1 nm), the d line (587.6 nm) and the C line (656.3 nm) as Fraunhofer lines at the point p (=p1, p0) are represented as ng(p), nF(p), nd(p), nC(p), where p0 is a position having a reference refractive index in the medium, and p1 is a position in the medium different from p0.

An Abbe number $vd(p)$ for the d line at a position p (=p1, pmax, pmin, pmaxgi, pmingi), a partial dispersion ratio $\theta gd(p)$ for the g line and the d line, and a partial dispersion ratio $\theta gF(p)$ for the g line and the F line in the embodiments are represented as follows:

$$vd(p)=\{nd(p)-1\}/\{\delta nF(p)-nC(p)\}$$

$$\theta gd(p)=\{ng(p)-nd(p)\}/\{\delta nF(p)-nC(p)\}$$

$$\theta gF(p)=\{ng(p)-nF(p)\}/\{\delta nF(p)-nC(p)\}$$

An anomalous dispersion $\Delta\theta gd$ for the g line and d line and an anomalous dispersion $\Delta\theta gF$ for the g line and F line are represented as follows. A partial dispersion ratio of a general optical material changes in almost the same tendency for a change of the Abbe number. Standard values $\theta gd0$ and $\theta gF0$ of the partial dispersion ratio at this time are represented as follows using a function of the Abbe number vd for the d line:

$$\theta gd0=-1.687\times 10^{-7}vd^3+5.702\times 10^{-5}vd^2-6.603\times 10^{-3}vd+1.462$$

$$\theta gF0=-1.665\times 10^{-7}vd^3+5.213\times 10^{-5}vd^2-5.656\times 10^{-3}vd+0.7278$$

The anomalous dispersion indicates a difference from this standard value. In other words, the anomalous dispersions $\Delta\theta gd$ and $\Delta\theta gF$ are represented as follows:

$$\Delta\theta gd=\theta gd-\theta gd0$$

$$\Delta\theta gF=\theta gF-\theta gF0$$

Since the optical element of the embodiments has a refractive index distribution in the medium, the refractive index changes according to the position p in the medium. Hence, the Abbe number and the partial dispersion ratio vary according to the position p.

A position pmax denotes a position in the medium which provides the largest value of the partial dispersion ratio for the g line and the F line. A position pmin denotes a position in the medium which provides the smallest value of the partial dispersion ratio for the g line and the F line.

The equivalent partial dispersion ratio and equivalent Abbe number in the refraction of the medium in the embodiments are represented as follows:

In an optical element having a homogeneous refractive index in the medium (referred to as a "homogeneous lens" hereinafter), a ray refracts at an interface between the medium and the atmosphere but does not refract in the medium. Since the refractive index in the medium varies according to a wavelength, the ray refracted in the homogeneous lens causes a chromatic aberration.

The refraction is caused by a phase difference of a light flux, and a phase difference is provided by changing of a shape in the homogeneous lens. At this time, the Abbe number for the d line as an index of a wavelength dispersion is represented by a ratio with a refractive index difference with air whose refractive index is assumed to 1.

On the other hand, in an optical element whose medium has a refractive index distribution (referred to as a "refractive index distribution lens" hereinafter), a ray refracts not only at an interface between the medium and the atmosphere but also in the medium. The chromatic aberration occurs in the refraction in the medium due to the wavelength dispersion of the refractive index distribution.

The phase difference caused by the refractive index distribution in the medium is caused by a difference between a refractive index at a reference position in the medium and a refractive index at a light passing position. Therefore, the wavelength dispersion in the refraction in the medium depends upon a ratio of the difference between the refractive index at the light passing position and the refractive index at the reference position.

A thus calculated wavelength dispersion can be equivalently treated as a wavelength dispersion of a virtual glass when the refraction in the medium is replaced with the virtual glass having a wavelength dispersion characteristic that provides an equal chromatic aberration. In other words, the wavelength dispersion in the refraction in the medium can be replaced with a virtual dioptric lens by using an equivalent Abbe number and an equivalent partial dispersion ratio.

Assume that $n\lambda(p0)$ denotes a reference refractive index at the position p0 for each wavelength when the medium has a refractive index distribution. Then, a refractive index difference $\delta n\lambda(p1)$, an equivalent Abbe number $vdgi(p1)$, equivalent partial dispersion ratios $\theta gFgi(p1)$ and $\theta gdgi(p1)$ at the position p1 in the medium are represented as follows:

$$\delta n\lambda(p1)=n\lambda(p1)-n\lambda(p0)$$

In other words, when it is assumed that $\delta ng(p1)$, $\delta nF(p1)$, $\delta nd(p1)$, and $\delta nC(p1)$ denote refractive index differences for the g line, the d line, the F line, and the C line at the position p1, the following equations are met:

$$\delta ng(p1)=ng(p1)-ng(p0)$$

$$\delta nd(p1)=nd(p1)-nd(p0)$$

$$\delta nF(p1)=nF(p1)-nF(p0)$$

$$\delta nC(p1)=nC(p1)-nC(p0))$$

$$vdgi(p1)=\delta nd(p1)/\{\delta nF(p1)-\delta nC(p1)\}$$

$$\theta gFgi(p1)=\{\delta ng(p1)-\delta nF(p1)\}/\{\delta nF(p1)-\delta nC(p1)\}$$

$$\theta gdgi(p1)=\{\delta ng(p1)-\delta nd(p1)\}/\{\delta nF(p1)-\delta nC(p1)\}$$

An anomalous dispersion $\Delta\theta gFgi$ for the g line and the F line in the refraction in the medium, and an anomalous dispersion $\Delta\theta gdgi$ for the g line and the d line are represented as follows:

$$\Delta\theta gdgi=\theta gdgi-\theta gdgi0$$

$$\Delta\theta gFgi=\theta gFgi-\theta gFgi0$$

Here, θgdgi0 and θgFgi0 are defined as follows using a function of the equivalent Abbe number vdgi:

$$\theta gdgi0 = -1.687 \times 10^{-7} vdgi^3 + 5.702 \times 10^{-5} vdgi^2 - 6.603 \times 10^{-3} vdgi + 1.462$$

$$\theta gFgi0 = -1.665 \times 10^{-7} vdgi^3 + 5.213 \times 10^{-5} vdgi^2 - 5.656 \times 10^{-3} vdgi + 0.7278$$

As discussed above, the optical element of the embodiments has a refractive index distribution and the refractive index varies according to the position p in the medium. Since a variation amount of a refractive index differs according to a wavelength, the equivalent Abbe number and the equivalent partial dispersion ratio vary according to the position p.

A position pmaxgi denotes a position that provides the largest equivalent partial dispersion ratio for the g line and the F line in the refraction in the medium. A position pmingi denotes a position that provides the smallest equivalent partial dispersion ratio for the g line and the F line in the refraction in the medium.

The radial refractive index distribution is a refractive distribution in which the refractive index changes in a direction orthogonal to the optical axis in the medium. The refractive index for a wavelength λ in the radial refractive index distribution can be expressed as follows where r denotes a distance from the optical axis in a direction orthogonal to the optical axis:

$$n_\lambda R(r) = \sum_{i=0}^{\infty} N_{\lambda i} R \cdot r^{2i} \quad \text{EQUATION 1}$$

At this time, the Abbe number vdR(r) for the d line, the partial dispersion ratio θgdR(r) for the g line and the d line, and the partial dispersion ratio θgFR(r) for the g line and the F line are represented as follows:

$$vdR(r) = \{ndR(r)-1\}/\{nFR(r)-nCR(r)\}$$

$$\theta gdR(r) = \{ngR(r)-ndR(r)\}/\{nFR(r)-nCR(r)\}$$

$$\theta gFR(r) = \{ngR(r)-nFR(r)\}/\{nFR(r)-nCR(r)\}$$

In the radial refractive index distribution, the refractive index difference $\delta n\lambda R(r)$ in the medium can be expressed using the refractive index on the optical axis as a reference refractive index:

$$\delta n\lambda R(r) = nAR(r) - nAR(0)$$

Moreover, the equivalent Abbe number vdgiR(r1) and the equivalent partial dispersion ratios θgFgiR(r1) and θgdgiR(r1) in the radial refractive index distribution with r1 that is larger than 0 are represented as follows:

$$vdgiR(r1) = \delta ndR(r1)/\{\delta nFR(r1) - \delta nCR(r1)\}$$

$$\theta gFgiR(r1) = \{\delta ngR(r1) - \delta nFR(r1)\}/\{\delta nFR(r1) - \delta nCR(r1)\}$$

$$\theta gdgiR(r1) = \{\delta ngR(r1) - \delta ndR(r1)\}/\{\delta nFR(r1) - \delta nCR(r1)\}$$

The anomalous dispersion ΔθgFgiR for the g line and F line and the anomalous dispersion ΔθgdgiR for the g line and the d line in the refraction in the medium are represented as follows:

$$\Delta\theta gdgiR = \theta gdgiR - \theta gdgiR0$$

$$\Delta\theta gFgiR = \theta gFgiR - \theta gFgiR0$$

Here, θgdgiR0 and θgFgiR0 are represented by using a function of the equivalent Abbe number vdgiR as follows:

$$\theta gdgiR0 = -1.687 \times 10^{-7} vdgiR^3 + 5.702 \times 10^{-5} vdgiR^2 - 6.603 \times 10^{-3} vdgiR + 1.462$$

$$\theta gFgiR0 = -1.665 \times 10^{-7} vdgiR^3 + 5.213 \times 10 - 5 vdgiR2 - 5.656 \times 10^{-3} vdgiR + 0.7278$$

Where rea denotes a light effective radius of a refractive index distribution lens that has a radial refractive index distribution, the partial dispersion ratios for the g line and the F line with a distance rea from the optical axis and on the optical axis (with a distance of 0) satisfy the following condition that is derived from or serves as the Condition (1):

$$|\theta gFR(rea) - \theta gFR(0)| \geq 0.02$$

The equivalent Abbe number vdgiR(r) may satisfy the following condition:

$$0 < vdgiR(r) \leq 80 \quad (6)$$

The axial refractive index distribution is a refractive index distribution in which the refractive index changes in the optical axis direction in the medium. A refractive index for a wavelength λ of the axial refractive index distribution can be represented as follows using a distance t in the optical axis direction from a point closest to the light incident side in the medium:

$$n_\lambda A(t) = \sum_{i=0}^{\infty} NA_{\lambda i} t^i \quad \text{EQUATION 2}$$

At this time, the Abbe number vdA for the d line, the partial dispersion ratio θgdA for the g line and the d line, and the partial dispersion ratio θgFA for the g line and the F line are represented as follows:

$$vdA(t) = \{ndA(t)-1\}/\{nFA(t)-nCA(t)\}$$

$$\theta gdA(t) = \{ngA(t)-ndA(t)\}/\{nFA(t)-nCA(t)\}$$

$$\theta gFA(t) = \{ngA(t)-nFA(t)\}/\{\delta nFA(t)-nCA(t)\}$$

In the axial refractive index distribution, the refractive index difference $\delta n\lambda A(t)$ in the medium can be expressed as follows:

$$\delta n\lambda A(t) = n\lambda A(t) - n\lambda A(0)$$

Moreover, the equivalent Abbe number vdgiA(t1), and the equivalent partial dispersion ratios θgFgiA(t1) and θgdgiA(t1) in the axial refractive index distribution are represented with t1 larger than 0:

$$vdgiA(t1) = \delta ndA(t1)/\{\delta nFA(t1) - \delta nCA(t1)\}$$

$$\theta gFgiA(t1) = \{\delta ngA(t1) - \delta nFA(t1)\}/\{\delta nFA(t1) - \delta nCA(t1)\}$$

$$\theta gdgiA(t1) = \{\delta ngA(t1) - \delta ndA(t1)\}/\{\delta nFA(t1) - \delta nCA(t1)\}$$

An anomalous dispersion ΔθgFgiA for the g line and the F line in the refraction in the medium, and an anomalous dispersion ΔθgdgiA for the g line and the d line are represented as follows:

$$\Delta\theta gdgiA = \theta gdgiA - \theta gdgiA0$$

$$\Delta\theta gFgiA = \theta gFgiA - \theta gFgiA0$$

Here, θgdgiA0 and θgFgiA0 are represented by using a function of the equivalent Abbe number vdgiA $$\theta gdgiA0 = -1.687 \times 10^{-7} vdgiA^3 + 5.702 \times 10^{-5} vdgiA^2 - 6.603 \times 10^{-3} vdgiA + 1.462$$

$$\theta gFgiA0 = -1.665 \times 10^{-7} vdgiA^3 + 5.213 \times 10^{-5} vdgiA^2 - 5.656 \times 10^{-3} vdgiA + 0.7278$$

Where tobj denotes a point closest to the light incident side in the optical axis direction and timg denotes a point closest to the light exit side in the optical axis direction in the medium, the partial dispersion ratios for the g line and the F line at the points tobj and timg satisfy the following condition that is derived from or serves as the Condition (1):

$$|\theta gFA(tobj) - \theta gFA(timg)| \geq 0.02 \quad (7)$$

The equivalent Abbe number vdgiA(t) may satisfy the following conditional expression:

$$0 < vdgiA(t) \leq 200 \quad (8)$$

For a method for producing an optical element that has a refractive index distribution, assume that the medium of the optical element is a mixture of a solid-state material and at least one optical material. In order to make a refractive index distribution, it is necessary to spatially distribute (change) a composition ratio between the solid-state material and the optical material in the medium. In the embodiments, the anomalous dispersions ΔθgFs and ΔθgFm of the solid-state material and the optical material for the g line and the F line satisfy the following condition:

$$|\Delta\theta gFs - \Delta\theta gFm| \geq 0.027 \quad (9)$$

At this time, assume that vds, vdm, θgFs, and θgFm denote the Abbe number of the solid-state material for the d line, the Abbe number of the optical material for the d line, the partial dispersion ratio of the solid-state material for the g line and the F line, and the partial dispersion ratio of the optical material for the g line and the F line, respectively.

A description will now be given of a technical meaning of each of the above Conditions. Each condition defines a wavelength dispersion characteristic of a refractive index distribution in the optical element of the embodiments. A variety of aberrations of the optical system, in particular, a chromatic aberration can be well corrected (reduced) when the wavelength dispersion characteristic illustrated in the Conditions (1)-(4) are satisfied.

A description will now be given of an appropriate correction method in the visible light containing the short wavelength area in the optical system. As described above, the wavelength dispersion of the general optical material has a predetermined tendency to the Abbe number, and that characteristic can be expressed as θgF0, θgd0, etc. In correcting aberrations of the rays of four wavelengths containing the g line, the d line, the F line, and the C line, one conceivable method is to use an optical material that has an anomalous dispersion that has large absolute values of ΔθgF and Δθgd.

A wavelength dispersion caused by the refraction in the refractive index distribution can be similarly considered. When an equivalent partial dispersion ratio has an anomalous dispersion, a chromatic aberration of the visible light containing the short wavelength area can be well corrected. In other words, the chromatic aberration can be well corrected in the refraction in the refractive index distribution when a change in the refractive index for the g line is greatly different from changes in the refractive index for the d line, the C line, and the F line.

When the Condition (1) is established, the refraction in the refractive index distribution has a more conspicuous anomalous dispersion. The left side of the expression of the Condition (1) much larger than the lower limit value will be accepted.

In the Condition (4), a value higher than the upper limit value makes difficult an aberrational correction since a color spherical aberration etc. occur greatly. A method of changing a composition ratio among a plurality of materials for a base material and of mixing them with each other or another method are known so as to make a refractive index distribution that does not satisfy the Condition (4), but a control over the composition ratio is difficult.

When the optical element has a radial refractive index distribution, the Condition (5) may be accepted because an appropriate correction of the chromatic aberration can become easy. Moreover, when the Condition (6) is met, the chromatic aberration can be well corrected in the wavelength region in the visible light from the C line to the F line except the short wavelength area.

When the optical element has an axial refractive index distribution, the Condition (7) may be accepted because an appropriate correction of the chromatic aberration can becomes easier. When the Condition (8) is met, the chromatic aberration can be well corrected in the wavelength region in the visible light from the C line to the F line except the short wavelength area.

The refractive index distribution that satisfies the Condition (1)-(4) can be obtained by selecting the solid-state material and at least one optical material that satisfy the Condition (9) in changing a mixture composition ratio in the medium between the solid-state material and the optical material so as to produce the optical element of the embodiments.

For instance, when inorganic oxide fine particles are mixed with a solid-state material and the mixture ratio is changed in the medium, the Condition (1)-(4) are met. The inorganic oxide may, for instance, $TiO_2$ (nd=2.304, vd=13.8), $Nb_2O_5$ (nd=2.367, vd=14.0), ITO (nd=1.8571, vd=5.69), $CrO_3$ (nd=2.2178, vd=13.4), $BaTiO_3$ (nd=2.4362, vd=11.3), etc.

When $TiO_2$ fine particles or ITO (Indium-Tin-Oxide) fine particles in these inorganic oxides are distributed in the solid-state material with appropriate volume ratio with the composition ratio changed, the optical element that satisfies the above conditions can be obtained.

When scattering is considered, these fine particles may have a grain size from 2 nm to 50 nm, and a dispersant etc. may be added to suppress coagulations.

As long as the Conditions (1)-(4) are met, the manufacturing method or the material is not limited to the above ones.

A refractive index N(λ) for a wavelength λ in the mixture having distributed fine particles can be easily calculated by the following equation that is lead from the well-known Drude formula:

$$N(\lambda) = [1 + V\{Nm^2(\lambda) - 1\} + (1-V)\{N0^2(\lambda) - 1\}]^{1/2}$$

where λ is an arbitrary wavelength, Nm is a refractive index of the distributed fine particle etc., N0 is a refractive index of polymer, etc. used to distribute the fine particles etc., and V is a ratio of the total volume of the fine particles etc. to the volume of polymer, etc.

Table 1 illustrates a refractive index of the above material for each wavelength, an Abbe number vd for the d line, a partial dispersion ratio θgF for the g line and the F line, and a partial dispersion ratio θgd for the g line and the d line.

The optical element having a refractive index distribution in the embodiments has a composition ratio between the solid-state material and the optical material changed according to the position p in the medium. Thereby, the partial dispersion ratio θgF(p) for the g line and the F line varies according to the position p in the medium. At this time, an absolute value of an anomalous dispersion $\Delta\theta gFgi(p)$ of an equivalent partial dispersion ratio for the refraction in the medium is likely to become larger as a change rate of the partial dispersion ratio $\theta gF(p)$ for the position p in the medium becomes larger. The chromatic aberration correction effect, which will be described later, can improve as $\Delta\theta gFgi(p)$ has a larger absolute value.

This embodiment corrects the chromatic aberration better than use of a partial dispersion ratio of a general optical material by using an optical element that has a larger or smaller value of an equivalent partial dispersion ratio.

In the wavelength dispersion characteristic in the refractive index of the optical material, the equivalent Abbe number illustrates a gradient of a dispersion characteristic curve, and the equivalent partial dispersion ratio illustrates a curvature of the dispersion characteristic curve.

In general, when a refractive index distribution element is made of an optical material, a refractive index distribution on the short wavelength side changes more greatly than that on the long wavelength side, an equivalent Abbe number for the d line, an equivalent partial dispersion ratio for the g line and the F line, an equivalent partial dispersion ratio for the g line and the d line have positive values. Therefore, the dispersion characteristic curve (the refractive index characteristic to the wavelength) has a shape of a convex downward, and its refractive index distribution changes more greatly on the short wavelength side as the wavelength is changed.

In a general optical material, a partial dispersion ratio changes almost linearly in the low dispersion area for an Abbe number, and the change rate is likely to increase in a high dispersion. An optical material outside this distribution is an optical material having an anomalous dispersion.

Figure 21:
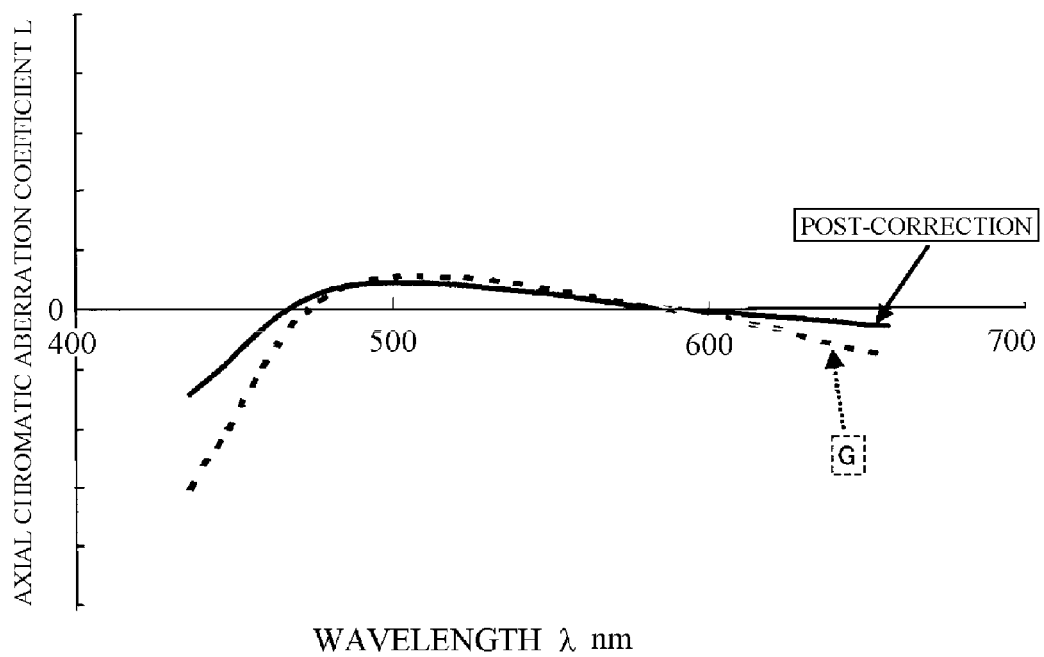
FIG. 21 is a view for explaining a wavelength characteristic of a chromatic aberration coefficient.

Assume that an optical system includes a part (optical system part) GNL made of an optical material having a large equivalent partial dispersion ratio, an optical system part GL made of an optical material having a small equivalent partial dispersion ratio, and a dioptric optical system part G made of an optical material having a general value. Referring now to FIG. 21, a description will be given of a correction of the chromatic aberration in this optical system.

In FIG. 21, a broken line G denotes a wavelength characteristic curve of a chromatic aberration coefficient (referred to as a "chromatic aberration coefficient curve" hereinafter) when the chromatic aberration of the dioptric optical system part G is corrected to some extent. Curves GNL and GL illustrate chromatic aberration coefficient curves in the optical system parts GNL and GL. A post-correction curve in which the chromatic aberration has been corrected illustrates a chromatic aberration coefficient curve that is made by introducing the optical system parts GNL and GL into the dioptric optical system part G and by correcting the chromatic aberration.

In general, the chromatic aberration coefficient curve in the optical system in which the chromatic aberration is corrected has a balanced chromatic aberration while there is a curve left on the short wavelength side like the broken line G. It is difficult to more appropriately correct the chromatic aberration using only a general optical material.

A gradient of a chromatic aberration coefficient changes around a design reference wavelength when the optical system part GNL is introduced with a proper power into the dioptric optical system part G. Since the optical system part GNL has a larger equivalent partial dispersion ratio than a general optical material, a change of the chromatic aberration coefficient curve on the short wavelength side becomes larger.

When the gradient of the chromatic aberration coefficient curve is corrected by the optical system part GNL in this case, the curvature of the dioptric optical system part G is cancelled on the short wavelength area and the chromatic aberration can be well corrected.

The optical system part GL has an optical system with a smaller equivalent partial dispersion ratio than that of a general optical material. Thus, the chromatic aberration coefficient curve indicates a comparatively linear characteristic.

In this case, the curvature of the chromatic aberration coefficient curve on the short wavelength area can be reduced by reducing the power of the dioptric optical system part G and by providing appropriate power to the optical system part GL. Thereby, the chromatic aberration can be well corrected in the area containing the short wavelength area in the visible light.

The optical element of the embodiments corrects a variety of aberrations including the chromatic aberration by combining it with a general optical material. Therefore, when the anomalous dispersion is too large, the correction of the chromatic aberration becomes difficult although the equivalent partial dispersion ratio needs the anomalous dispersion to correct the aberration.

When a lens having a characteristic quite different from that of a general optical material is used, a change of a wavelength dependency of the chromatic aberration coefficient especially remarkable. In order to correct this large change or finally the chromatic aberration, the powers of other lenses may be greatly changed. Nevertheless, as the power is greatly changed, the aberration correction becomes difficult because the great changes of the power causes a variety of aberrations, such as a spherical aberration, a coma, and an astigmatism.

When a numerical range of the Condition (1) for the wavelength dispersion of the optical element is set as follows, the chromatic aberration can be well corrected:

$$0.020 \leq |\theta gF(p\max) - \theta gF(p\min)| \leq 0.800 \tag{1a}$$

For aberrational corrections, the numerical range of (1a) may be set as follows:

$$0.030 \leq |\theta gF(p\max) - \theta gF(p\min)| \leq 0.750 \tag{1b}$$

The numerical range of (1b) may be set as follows:

$$0.040 \leq |\theta gF(p\max) - \theta gF(p\min)| \leq 0.700 \tag{1c}$$

When a numerical range of the Condition (2) regarding an equivalent partial dispersion ratio for the g line and the F line in the refraction in the medium of the optical element is set as follows, the chromatic aberration can be corrected better:

$$0.0272 \leq |\Delta\theta gFgi(p1)| \leq 1.000 \tag{2a}$$

For the aberrational corrections, the numerical range of (2a) may be set as follows:

$$0.050 \leq |\Delta\theta gFgi(p1)| \leq 0.900 \tag{2b}$$

The numerical range of (2b) may be set as follows:

$$0.080 \leq |\Delta\theta gFgi(p1)| \leq 0.800 \tag{2c}$$

When the numerical range of the Condition (3) concerning an equivalent partial dispersion ratio for the g line and the d line in the refraction of the medium of the optical element is set as follows, the chromatic aberration can be corrected better.

$$0.025 \leq |\Delta\theta gdgi(p1)| \leq 1.000 \tag{3a}$$

The numerical range of (3a) may be set as follows:

$$0.050 \leq |\Delta\theta gdgi(p1)| \leq 0.900 \tag{3b}$$

The numerical range of (3b) may be set as follows:

$$0.080 \leq |\Delta\theta gdgi(p1)| \leq 0.800 \tag{3c}$$

When the numerical range of the Condition (4) concerning an equivalent partial dispersion ratio for the g line and the F line in the refraction of the medium of the optical element is set as follows, the chromatic aberration can be corrected better:

$$|\theta gFgi(pmaxgi)-\theta gFgi(pmingi)|\leq 0.09 \quad (4a)$$

The numerical range of (4a) may be set as follows:

$$|\theta gFgi(pmaxgi)-\theta gFgi(pmingi)|\leq 0.08 \quad (4b)$$

When the numerical range of the Condition (5) concerning the partial dispersion ratio for the g line and the F line in the radial refractive index distribution lens is set as follows, the chromatic aberration can be corrected better:

$$0.020\leq |\theta gFR(rea)-\theta gFR(0)|\leq 0.800 \quad (5a)$$

The numerical range of (5a) may be set as follows:

$$0.030\leq |\theta gFR(rea)-\theta gFR(0)|\leq 0.750 \quad (5b)$$

The numerical range of (5b) may be set as follows:

$$0.040\leq |\theta gFR(rea)-\theta gFR(0)|\leq 0.700 \quad (5c)$$

When the numerical range of the Conditional Expression (6) concerning an equivalent Abbe number for the d line in the radial refractive index distribution lens is set as follows, the chromatic aberration can be corrected better:

$$0<\nu dgiR(r)\leq 60 \quad (6a)$$

The numerical range of (6a) may be set as follows:

$$0<\nu dgiR(r)\leq 40 \quad (6b)$$

When the numerical range of the Conditional Expression (7) concerning the partial dispersion ratio for the g line and the F line in the axial refractive index distribution lens is set as follows, the chromatic aberration can be corrected better:

$$0.020\leq |\theta gFA(tobj)-\theta gFA(timg)|\leq 0.800 \quad (7a)$$

The numerical range of (7a) may be set as follows:

$$0.030\leq |\theta gFA(tobj)-\theta gFA(timg)|\leq 0.750 \quad (7b)$$

The numerical range of (7b) may be set as follows:

$$0.050\leq |\theta gFA(tobj)-\theta gFA(timg)|\leq 0.700 \quad (7c)$$

When the numerical range of the Conditional Expression (8) concerning an equivalent Abbe number for the d line in the axial refractive index distribution lens is set as follows, the chromatic aberration may be corrected better.

$$0<\nu dgiA(t)\leq 100 \quad (8a)$$

The numerical range of (8a) may be set as follows:

$$0<\nu dgiA(t)\leq 60 \quad (8b)$$

The numerical range of (8b) may be set as follows:

$$0<\nu dgiA(t)\leq 40 \quad (8c)$$

Each embodiment uses the optical element that satisfies the Conditional Expression (1)-(4) for the optical system. A refractive surface formed by these optical elements may have an aspheric shape. Thereby, a chromatic aberration flare, such as a color spherical aberration, may be easily corrected. When an interface is formed between the optical element and an optical material or an atmosphere, such as air, which has a large refractive index difference from the optical element, the chromatic aberration can be changed comparatively greatly with a little curvature change in the interface, and consequently the chromatic aberration can be corrected easily.

A description will now be given of specific embodiments of the optical system that uses the optical element (refractive index distribution lens) that has the above refractive index distribution.

Figure 2:
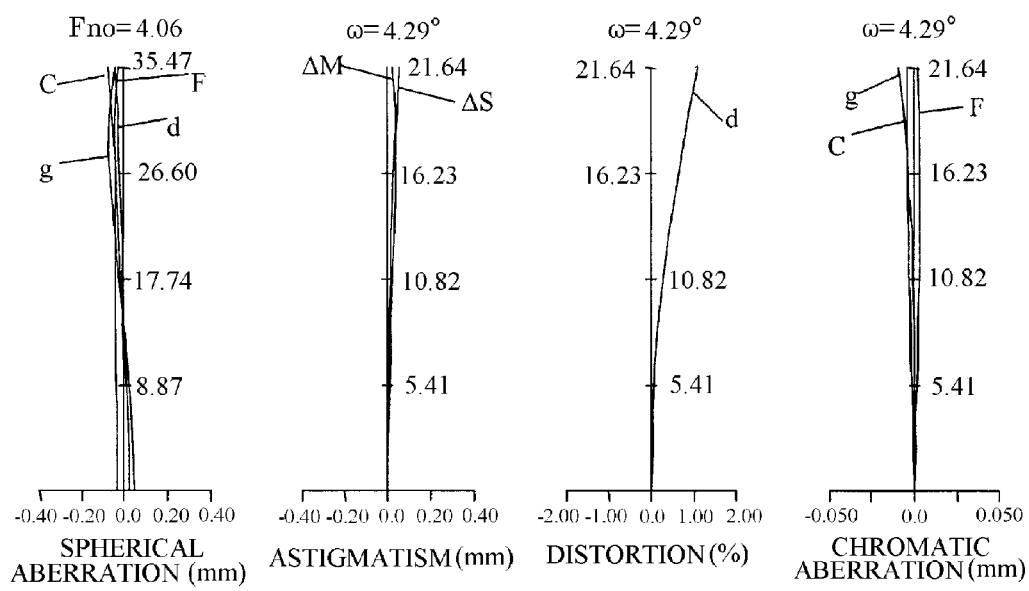
FIG. 2 is an aberrational diagram of the first embodiment.
Figure 3:
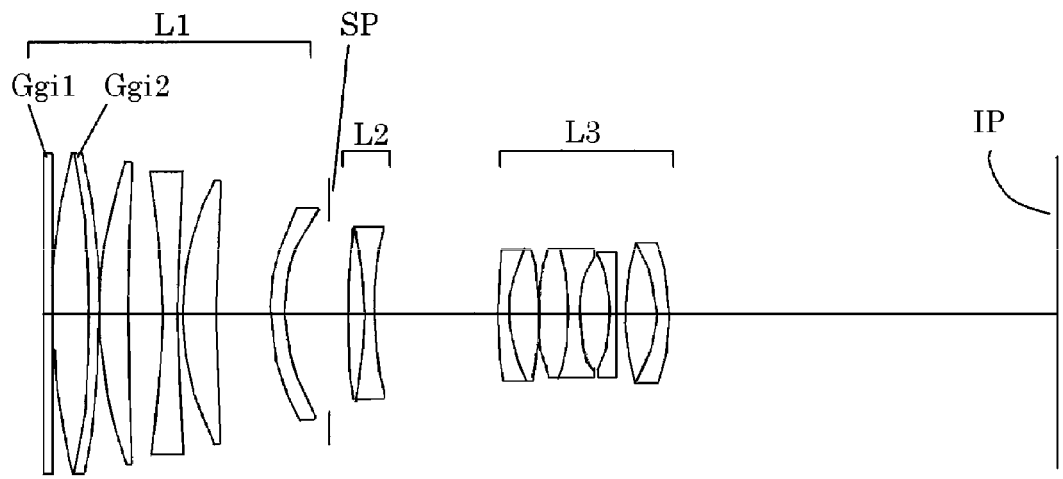
FIG. 3 is a sectional view of an optical system that includes an optical element according to a second embodiment of the present invention.
Figure 4:
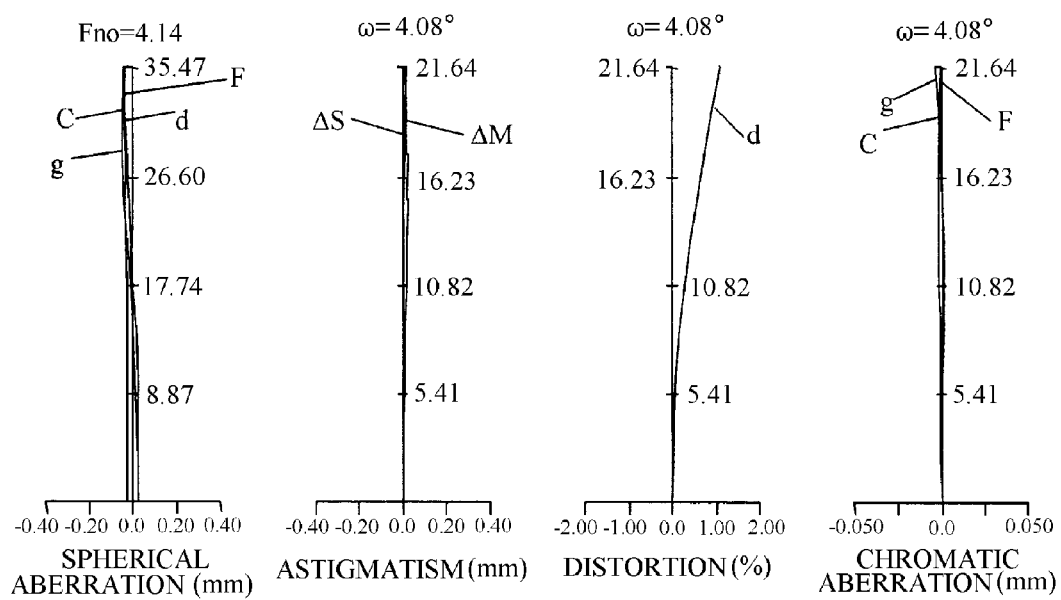
FIG. 4 is an aberrational diagram of the second embodiment.
Figure 5:
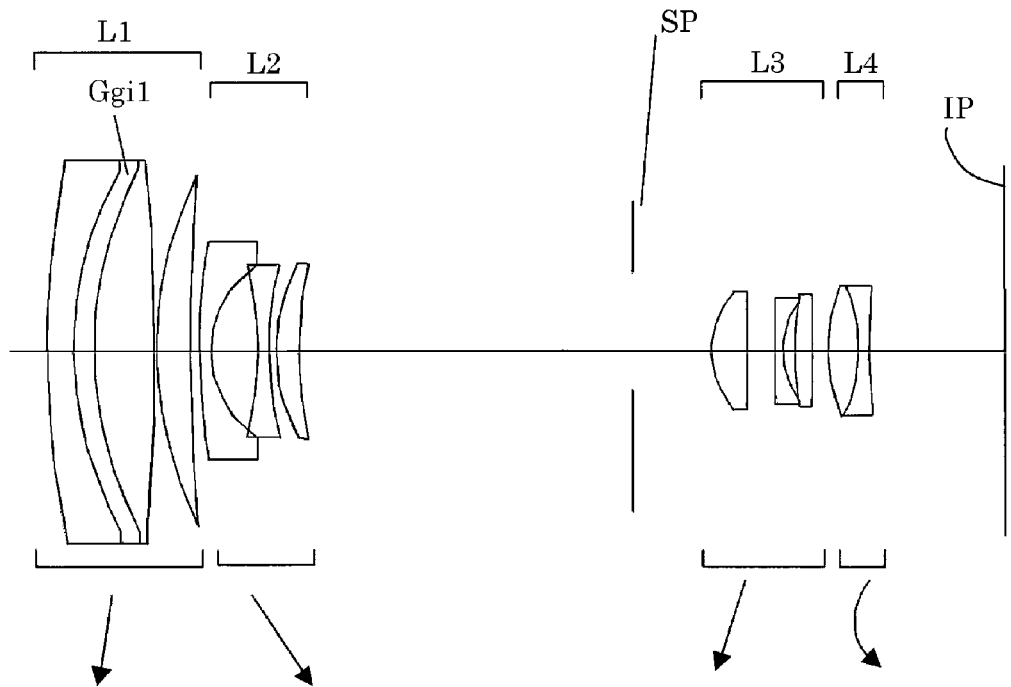
FIG. 5 is a sectional view of an optical system that includes an optical element according to a third embodiment of the present invention.
Figure 6A:
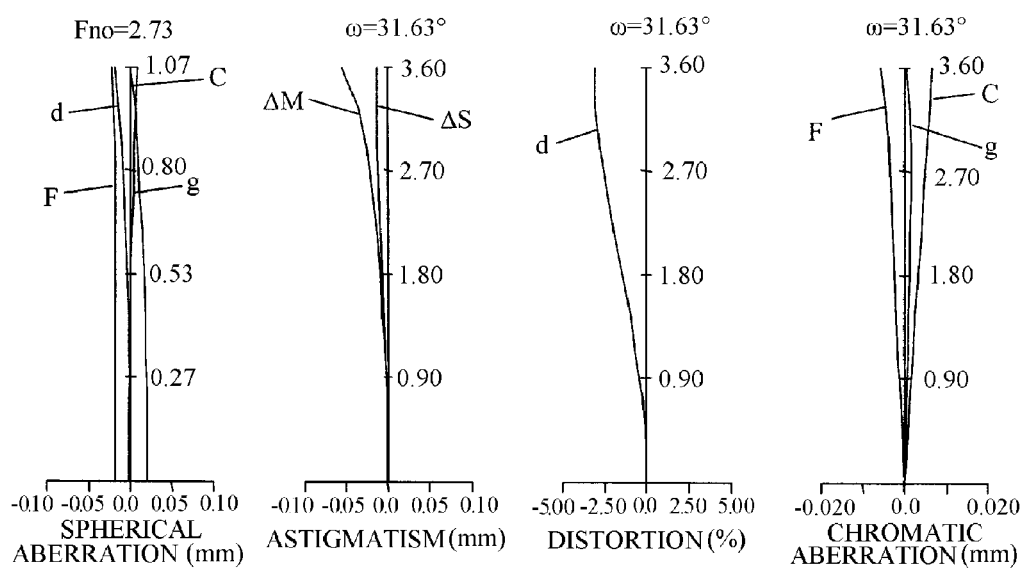
FIGS. 6A, 6B and 6C are aberrational diagrams at a wide-angle end, an intermediate zoom position, and a telephoto end of the third embodiment.
Figure 6B:
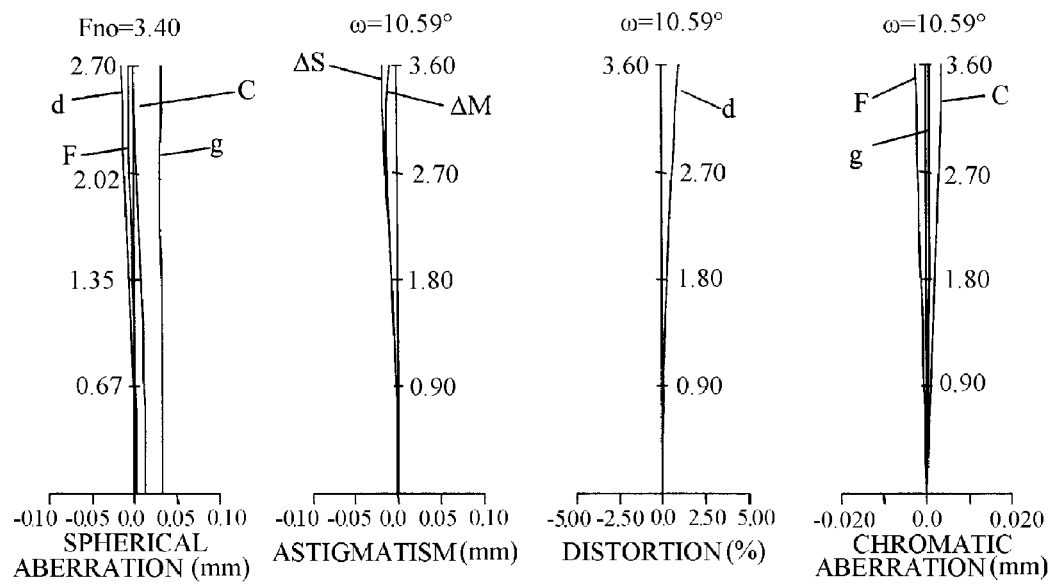
Figure 6C:
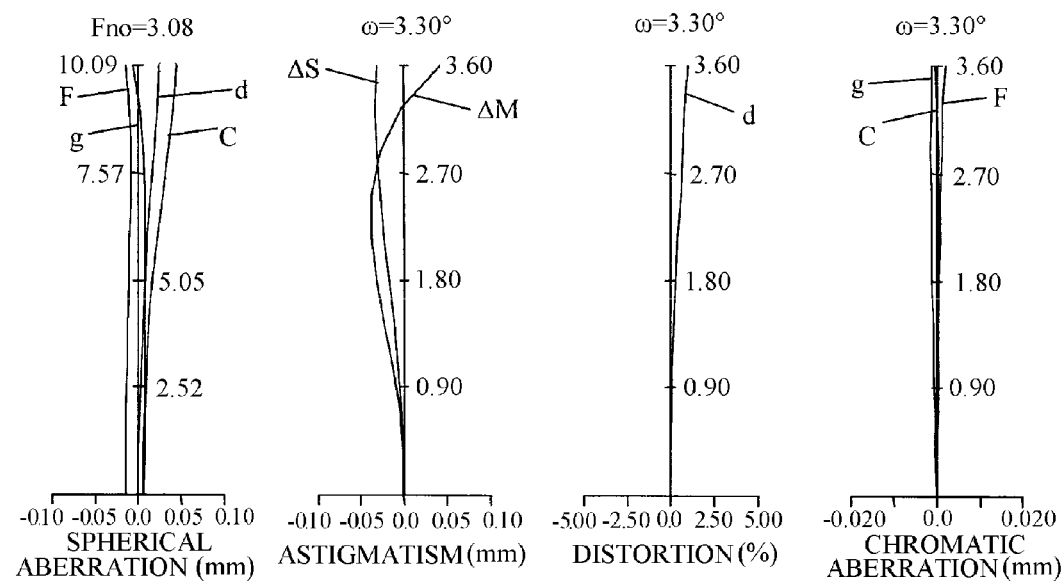

FIG. 1 is a lens sectional view of the optical system according to a first embodiment. FIG. 2 is an aberrational diagram when the optical system of the first embodiment focuses on the infinitely distant object. FIG. 3 is a lens sectional view of the optical system according to a second embodiment. FIG. 4 is an aberrational diagram when the optical system of the second embodiment focuses on the infinitely distant object. FIG. 5 is a lens sectional view at a wide-angle end of an optical system according to a third embodiment. FIGS. 6A, 6B, and 6C are aberrational diagrams when the optical system of the third embodiment focuses on the infinitely distant object at the wide-angle end, the intermediate zoom position, and the telephoto end, respectively.

Figure 7:
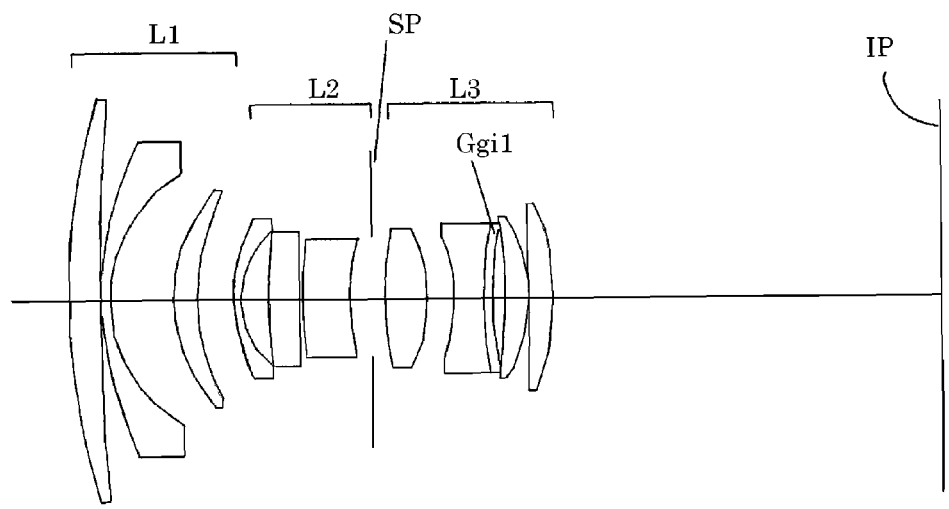
FIG. 7 is a sectional view of an optical system that includes an optical element according to a fourth embodiment of the present invention.
Figure 8:
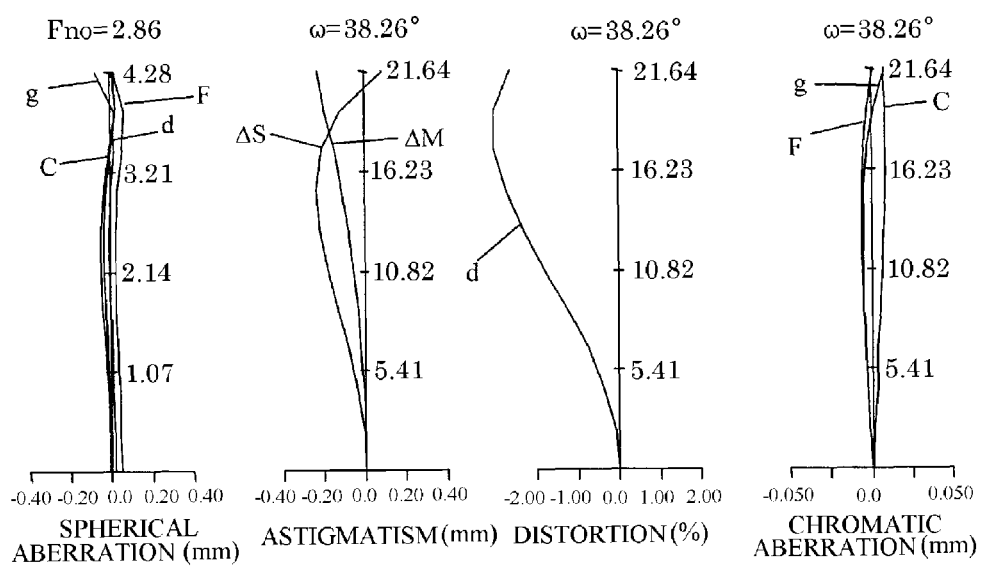
FIG. 8 is an aberrational diagram of the fourth embodiment.
Figure 9:
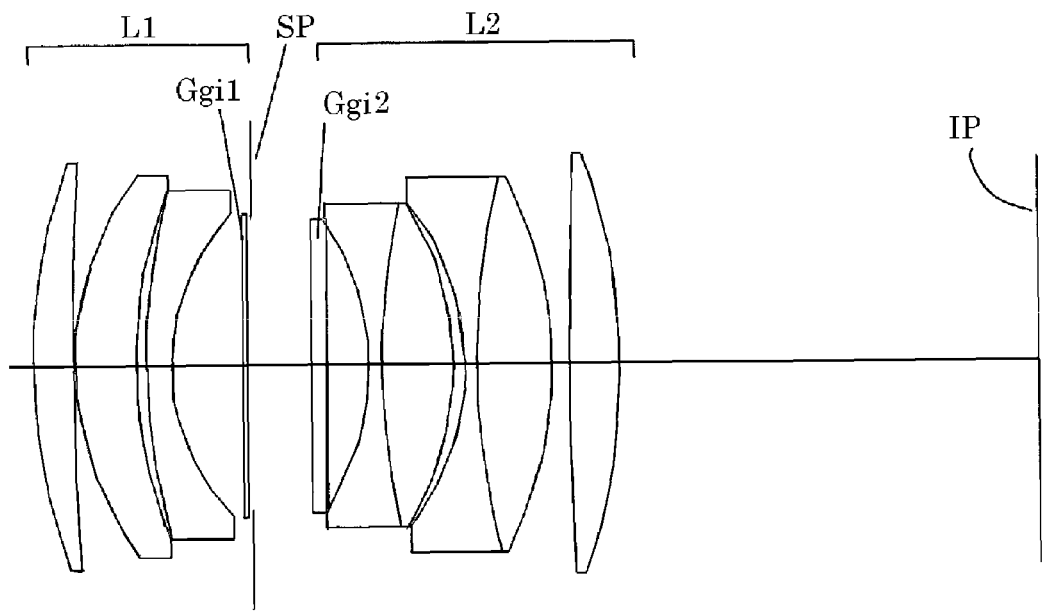
FIG. 9 is a sectional view of an optical system that includes an optical element according to a fifth embodiment of the present invention.
Figure 10:
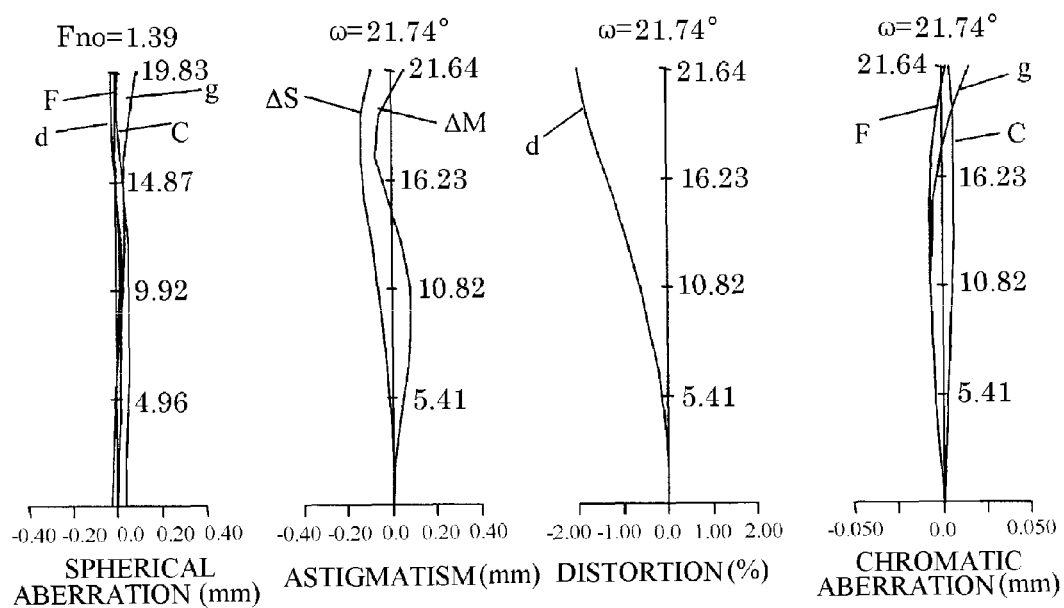
FIG. 10 is an aberrational diagram of the fifth embodiment.
Figure 11:
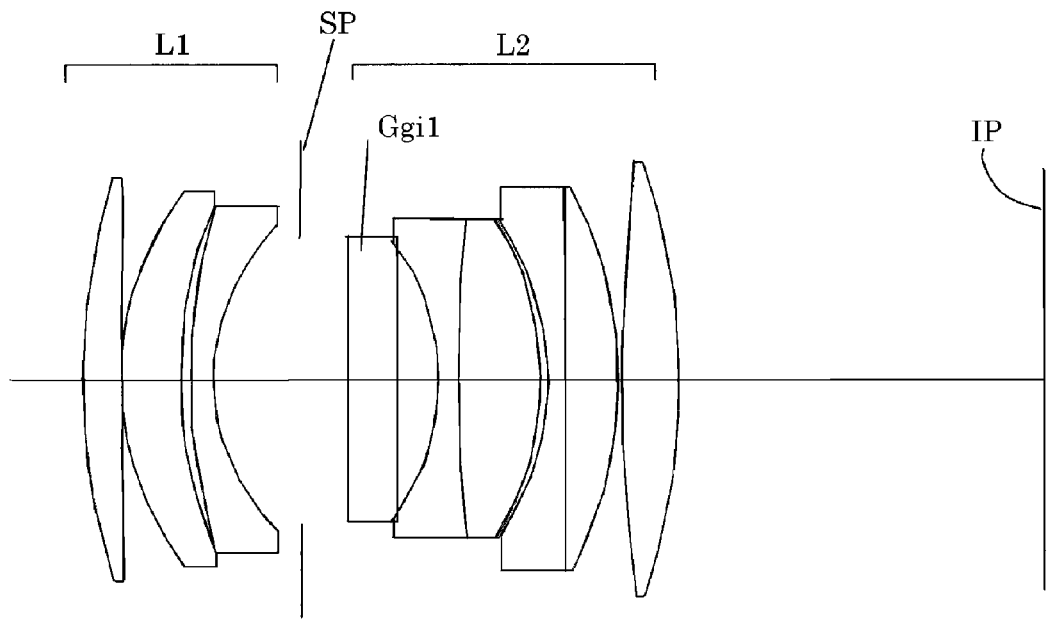
FIG. 11 is a sectional view of an optical system that includes an optical element according to a sixth embodiment of the present invention.
Figure 12:
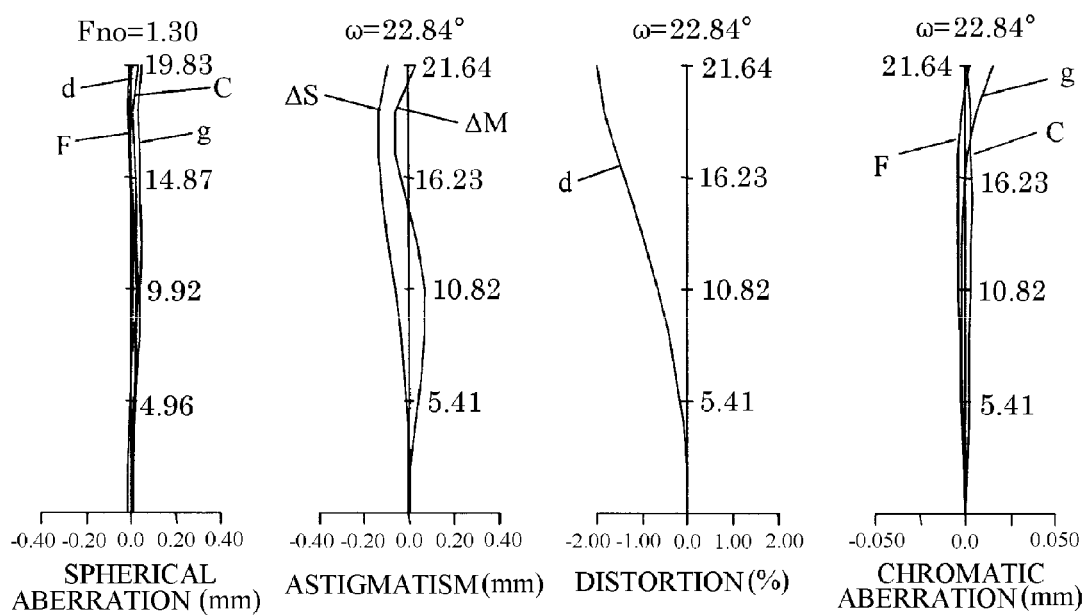
FIG. 12 is an aberrational diagram of the sixth embodiment.

FIG. 7 is a lens sectional view of an optical system according to a fourth embodiment. FIG. 8 is an aberrational diagram when the optical system of the fourth embodiment focuses on the infinitely distant object. FIG. 9 is a lens sectional view of the optical system according to a fifth embodiment. FIG. 10 is an aberrational diagram when the optical system of the fifth embodiment focuses on the infinitely distant object. FIG. 11 is a lens sectional view of an optical system according to a sixth embodiment. FIG. 12 is an aberrational diagram when the optical system of the sixth embodiment focuses on the infinitely distant object.

Figure 13:
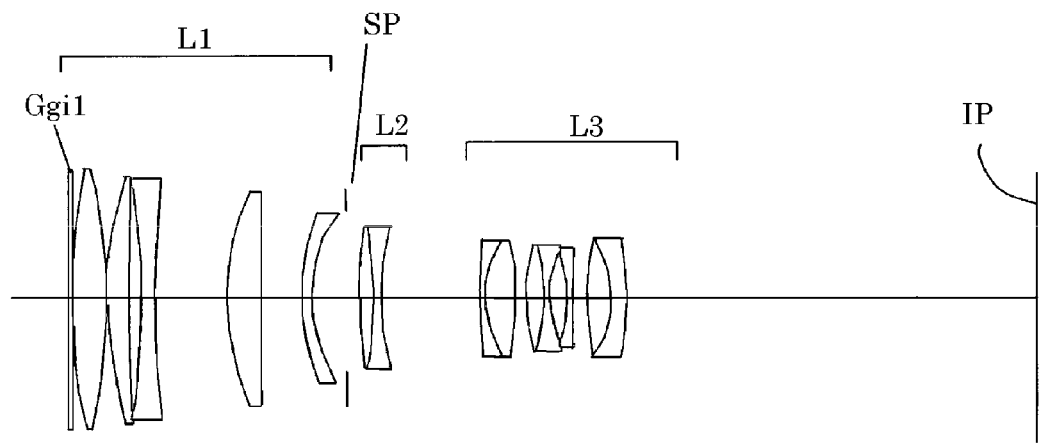
FIG. 13 is a sectional view of an optical system that includes an optical element according to a seventh embodiment of the present invention.
Figure 14:
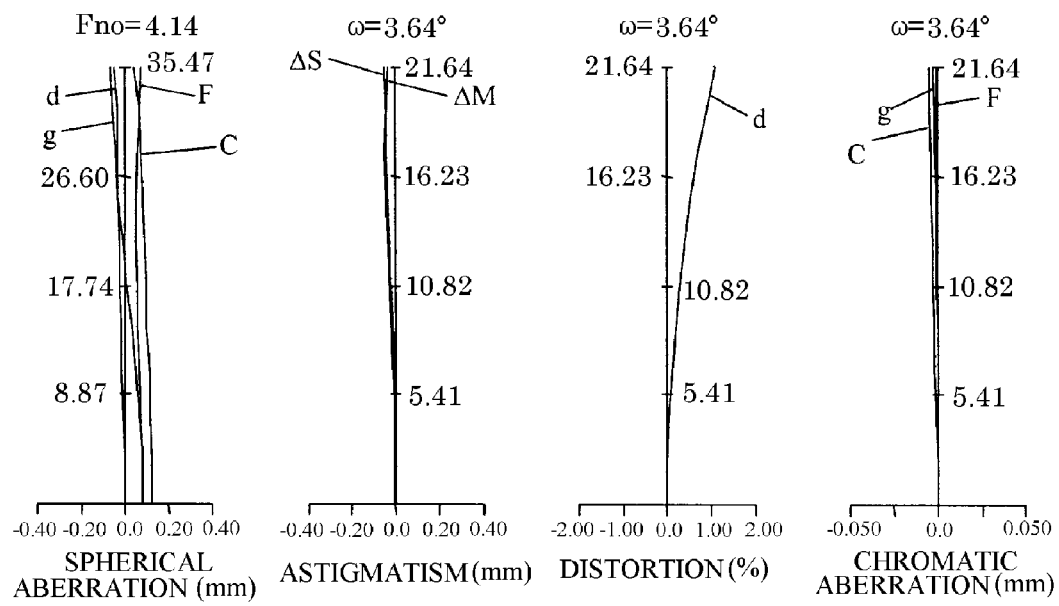
FIG. 14 is an aberrational diagram of the seventh embodiment.
Figure 15:
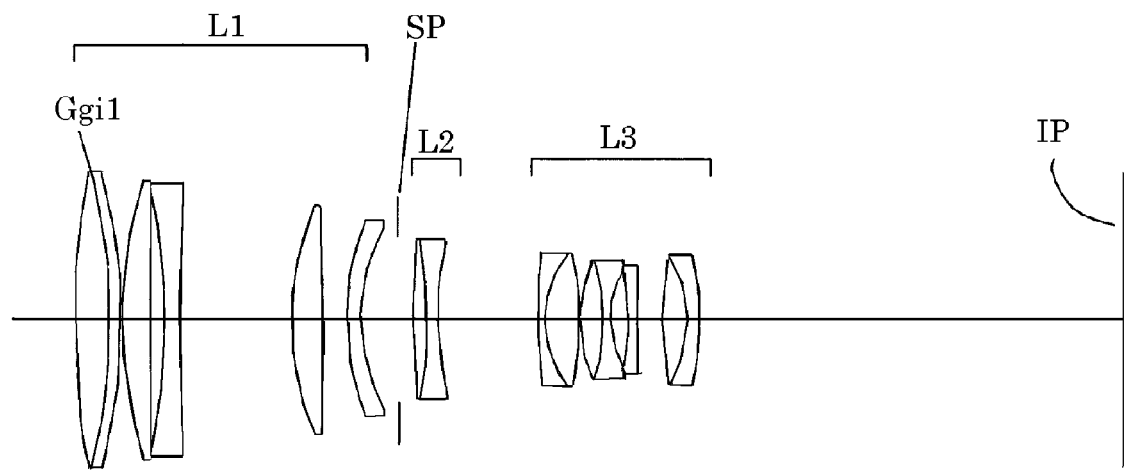
FIG. 15 is a sectional view of an optical system that includes an optical element according to an eighth embodiment of the present invention.
Figure 16:
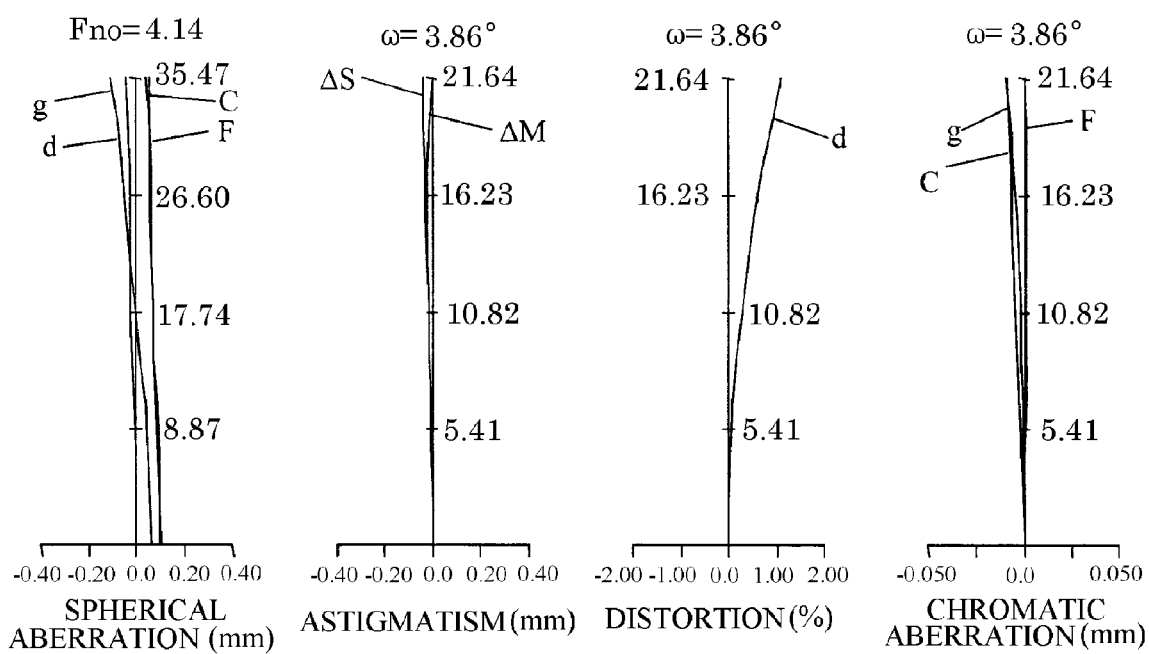
FIG. 16 is an aberrational diagram of the eighth embodiment.
Figure 17:
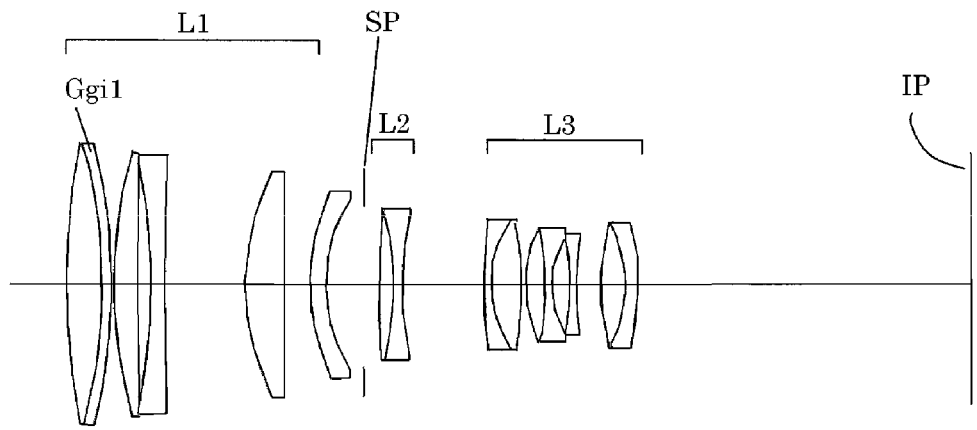
FIG. 17 is a sectional view of an optical system that includes an optical element according to a ninth embodiment of the present invention.
Figure 18:
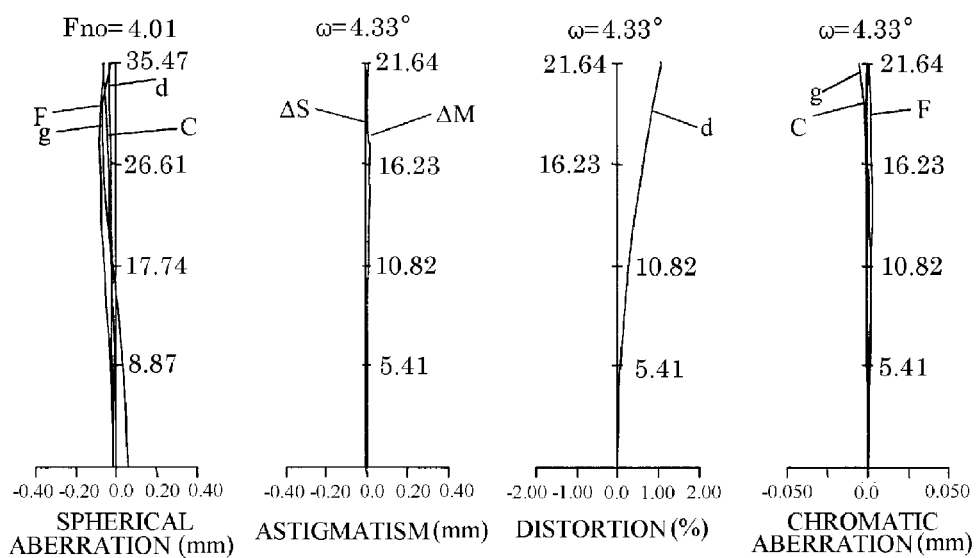
FIG. 18 is an aberrational diagram of the ninth embodiment.
Figure 19:
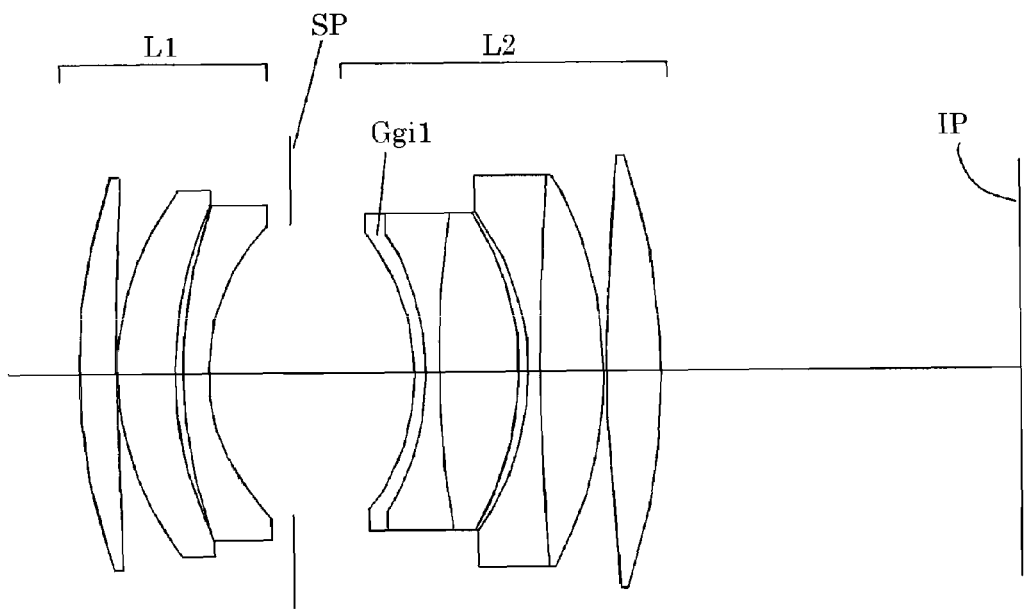
FIG. 19 is a sectional view of an optical system that includes an optical element according to a tenth embodiment of the present invention.
Figure 20:
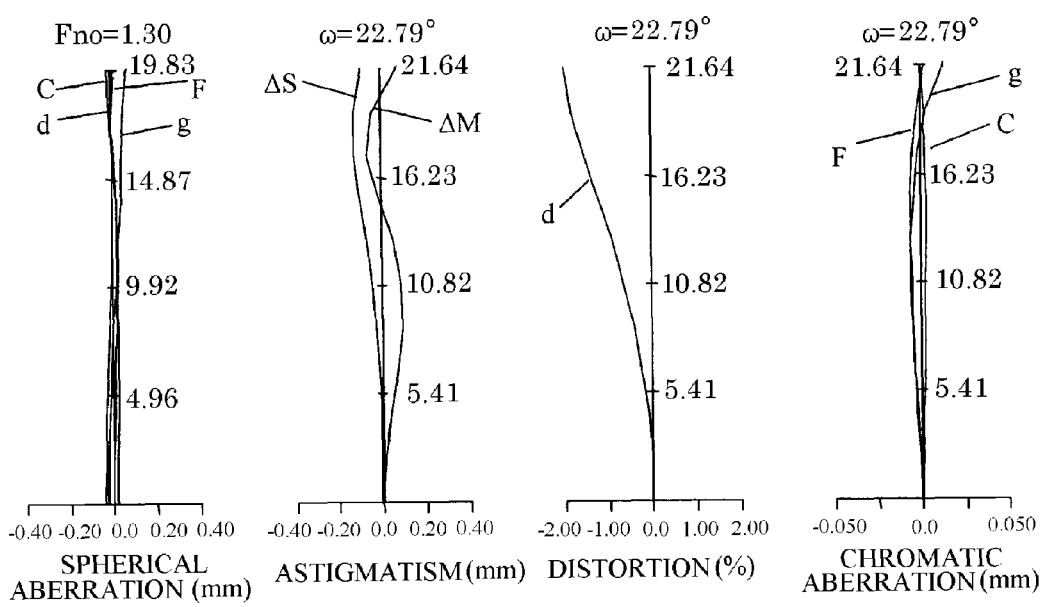
FIG. 20 is an aberrational diagram of the tenth embodiment.

FIG. 13 is a lens sectional view of the optical system according to a seventh embodiment. FIG. 14 is an aberrational diagram when the optical system of the seventh embodiment focuses on the infinitely distant object. FIG. 15 is a lens sectional view of the optical system according to an eighth embodiment. FIG. 16 is an aberrational diagram when the optical system of the eighth embodiment focuses on the infinitely distant object. FIG. 17 is a lens sectional view of the optical system according to a ninth embodiment. FIG. 18 is an aberrational diagram when the optical system of the ninth embodiment focuses on the infinitely distant object. FIG. 19 is a lens sectional view of the optical system according to a tenth embodiment. FIG. 20 is an aberrational diagram when the optical system of the tenth embodiment focuses on the infinitely distant object.

The optical system of each embodiment is an image pickup lens system used for an image apparatus such as a video camera, a digital still camera, and a film-based camera. In the lens sectional view, the left side is an object side (front side) and the right side is an image side (backside).

When the optical system of each embodiment is used as a projection lens for a projector, etc., the left side is a projection surface (screen) side, and a right side is a side of an original image to be projected onto the projection surface.

In the lens sectional view, "OL" denotes an optical system, "i" denotes the lens order from the object side, "Li" denotes an i-th lens, and "SP" denotes an aperture stop. "IP" denotes an image surface, on which an exposure surface corresponding to an image pickup surface of a solid-state image sensing device in an image pickup apparatus and a film plane in a film-based camera is arranged.

Ggij (j=1, 2, 3 . . . ) denotes a refractive index distribution lens. The optical system of each embodiment contains at least one refractive index distribution lens.

In the aberrational diagram, d, g, C, and F denote aberrations for the d line, the g line, the C line, and the F line. ΔM and ΔS denote a meridional image surface and a sagittal image surface, respectively. The lateral chromatic aberration is represented by the g line. "ω" denotes half an angle of view and "Fno" denotes an F number.

First Embodiment

An optical system according to a first embodiment (numerical example 1) illustrated in FIG. 1 includes, in order from an object side to an image side, a first lens unit L1 that is fixed during focusing and has a positive power, a second lens unit L2 that is moved in the optical axis direction during focusing and has a negative refractive power, and a third lens unit L3 that is fixed during focusing and has a negative power. This optical system is a reducing and once inversely imaging optical system.

The optical system of the first embodiment includes a telephoto lens having a focal length of 294 mm and a telephoto ratio of 0.80 (which is a value made by dividing a length along the optical axis direction from a first lens surface to an image surface by the focal length).

The first embodiment uses for the first lens unit L1 a refractive index distribution lens Ggi1 including a medium in which ITO fine particles are distributed in UV curing resin 1 with varied composition ratios.

This refractive index distribution lens Ggi1 is a radial refractive index distribution lens in which its refractive index changes in a direction orthogonal to the optical axis (or radial direction). A medium of the refractive index distribution lens Ggi1 is a mixture made by distributing ITO fine particles in UV curing resin 1 with a volume ratio of 5.05% in the maximum and of 0.0% in the minimum. A composition ratio of the ITO fine particles increases in the radial direction from the optical axis of the refractive index distribution lens.

Hence, the partial dispersion ratio for the g line and the F line of the refractive index distribution lens Ggi1 becomes maximum on the optical axis and minimum at an outermost effective position (referred to as an "effective diameter position" hereinafter) in the radial direction. In other words, $\theta gF(pmax)=\theta gFR(0)$ and $\theta gF(pmin)=\theta gFR(rea)$ are established. An equivalent partial dispersion ratio for the g line and F line becomes minimum on the optical axis and maximum at the effective diameter position. The position pmaxgi is an effective diameter position, and the position pmingi is a position on the optical axis.

Both a light incident surface and a light exit surface of the refractive index distribution lens Ggi1 used for the optical system of the first embodiment have planar shapes. Therefore, the interface between the atmosphere and the medium has substantially no power. The medium has a negative power. An equivalent partial dispersion ratio for the g line and F line is smaller than that of a general optical material.

The optical system of the first embodiment has a telephoto type power arrangement which has a positive power on the object side and a negative power on the image side with respect to the aperture stop SP. The first embodiment well corrects a variety of aberrations, particularly a chromatic aberration, by including the refractive index distribution lens Ggi1 in the first lens unit L1 arranged in front of the aperture stop SP and configured to make comparatively high a passing position of the paraxial light on the object side with respect to the aperture stop SP.

Second Embodiment

An optical system according to a second embodiment (numerical example 2) illustrated in FIG. 3 includes, in order from an object side to an image side, a first lens unit L1 that is fixed during focusing and has a positive power, a second lens unit L2 that is moved in the optical axis direction during focusing and has a negative refractive power, and a third lens unit L3 that is fixed during focusing and has a negative power. This optical system is a reducing and once inversely imaging optical system.

The optical system of the second embodiment includes a telephoto lens having a focal length of 294 mm and a telephoto ratio of 0.765.

The second embodiment uses two refractive index distribution lenses for the first lens unit L1. The refractive index distribution lens Ggi1 includes a medium in which ITO fine particles are distributed in UV curing resin 2 with varied composition ratios. The refractive index distribution lens Ggi2 includes a medium in which $TiO_2$ fine particles are distributed in UV curing resin 1 with varied composition ratios.

Each of these refractive index distribution lenses Ggi1 and Ggi2 is a radial refractive index distribution lens in which its refractive index changes in the radial direction. A medium of the refractive index distribution lens Ggi1 is a mixture made by distributing the ITO fine particles in the UV curing resin 2 with a volume ratio of 5.05% in the maximum and of 0.0% in the minimum. A composition ratio of the ITO fine particles increases in the radial direction from the optical axis.

A medium of the refractive index distribution lens Ggi2 is a mixture made by distributing the $TiO_2$ fine particles in the UV curing resin 1 with a volume ratio of 3.0% in the maximum and of 0.0% in the minimum. A composition ratio of the $TiO_2$ fine particles decreases from the optical axis in the radial direction.

Hence, the partial dispersion ratio for the g line and the F line of the refractive index distribution lens Ggi1 becomes maximum on the optical axis and minimum at an effective diameter position. In other words, $\theta gF(pmax)=\theta gFR(0)$ and $\theta gF(pmin)=\theta gFR(rea)$ are established. An equivalent partial dispersion ratio for the g line and F line becomes minimum on the optical axis and maximum at the effective diameter position. The position pmaxgi is an effective diameter position, and the position pmingi is a position on the optical axis.

The partial dispersion ratio for the g line and the F line of the refractive index distribution lens Ggi2 becomes maximum on the optical axis and minimum at an effective diameter position. In other words, $\theta gF(pmax)=\theta gFR(0)$ and $\theta gF(pmin)=\theta gFR(rea)$ are established. An equivalent partial dispersion ratio for the g line and F line becomes minimum on the optical axis and maximum at the effective diameter position. The position pmaxgi is an effective diameter position, and the position pmingi is a position on the optical axis.

Both a light incident surface and a light exit surface of the refractive index distribution lens Ggi1 used for the optical system of the second embodiment have planar shapes. Therefore, the interface between the atmosphere and the medium has substantially no power. The medium has a negative power. An equivalent partial dispersion ratio for the g line and F line is smaller than that of a general optical material. In addition, resin having an anomalous dispersion characteristic is used for a medium in which the ITO fine particles are dispersed. Thereby, an equivalent partial dispersion ratio has a stronger anomalous dispersion characteristic.

Both a light incident surface and a light exit surface of the refractive index distribution lens Ggi2 used for the optical system of the second embodiment have curved shapes. Therefore, the interface between the atmosphere and the medium has a power. The medium has a positive power. An equivalent partial dispersion ratio for the g line and F line is larger than that of a general optical material.

The chromatic aberration can be more effectively corrected than a general optical material by using both a refractive index distribution lens having a small equivalent partial dispersion ratio and a refractive index distribution lens having a large equivalent partial dispersion ratio.

The optical system of the second embodiment has a telephoto type power arrangement which has a positive power on the object side and a negative power on the image side with respect to the aperture stop SP. The second embodiment well corrects a variety of aberrations, particularly a chromatic aberration, by including the refractive index distribution lenses Ggi1 and Ggi2 in the first lens unit L1 arranged in front of the aperture stop SP and configured to make comparatively high a passing position of the paraxial light on the object side with respect to the object than the aperture stop SP.

Third Embodiment

An optical system according to a third embodiment (numerical example 3) illustrated in FIG. 5 includes, in order from an object side to an image side, a first lens unit L1 having a positive power, a second lens unit L2 having a negative refractive power, a third lens unit L3 having a positive power, and a fourth lens unit L4 having a positive power. This optical system is a zoom lens including four lens units and having a zoom ratio of about 12 times.

An arrow in FIG. 5 illustrates a movement locus of each lens unit during zooming from a wide-angle end to a telephoto end. In zooming, respective lens units move so as to change intervals between adjacent lens units. Moreover, the fourth lens unit L4 moves in the optical axis direction for focusing. This optical system is a reducing and once inversely imaging optical system.

The third embodiment uses a refractive index distribution lens for the first lens unit L1. The refractive index distribution lens Ggi1 including a medium in which ITO fine particles are distributed in UV curing resin 1 with varied composition ratios.

This refractive index distribution lens Ggi1 is a radial refractive index distribution lens in which its refractive index changes in a radial direction. A medium of the refractive index distribution lens Ggi1 is a mixture made by distributing the ITO fine particles in the UV curing resin 1 with a volume ratio of 3.34% in the maximum and of 0.0% in the minimum. A composition ratio of the ITO fine particles increases in the radial direction from the optical axis.

Hence, the partial dispersion ratio for the g line and the F line of the refractive index distribution lens Ggi1 becomes maximum on the optical axis and minimum at an effective diameter position. In other words, θgF(pmax)=θgFR(0) and θgF(pmin)=θgFR(rea) are established. An equivalent partial dispersion ratio for the g line and F line becomes maximum on the optical axis and minimum at the effective diameter position. The position pmaxgi is a position on the optical axis, and the position pmingi is an effective diameter position.

Both a light incident surface and a light exit surface of the refractive index distribution lens Ggi1 used for the optical system of the third embodiment have curved shapes. The refractive index distribution lens Ggi1 is arranged between two lenses and closely joined with these lenses. The interface between the atmosphere and the medium has a power. The medium has a negative power. An equivalent partial dispersion ratio for the g line and F line is smaller than that of a general optical material.

The third embodiment includes the refractive index distribution lens Ggi1 in the first lens unit L1 among the lens units in the zoom lens, on the object side with respect to the aperture stop SP and configured to make comparatively high a passing position of the paraxial light at the telephoto end. Thereby, the third embodiment well corrects a variety of aberrations, in particular a chromatic aberration.

Fourth Embodiment

An optical system according to a fourth embodiment (numerical example 4) illustrated in FIG. 7 includes, in order from an object side to an image side, a first lens unit L1 having a negative power, a second lens unit L2 that is configured to move in the optical axis direction for focusing and has a negative refractive power, and a third lens unit L3 that is configured to move in the optical axis direction for focusing and has a positive power.

This optical system of the fourth embodiment is a wide-angle lens having a focal length of about 24 mm, and a reducing and once inversely imaging optical system utilizing floating.

The fourth embodiment uses a refractive index distribution lens for the third lens unit L3. The refractive index distribution lens Ggi1 including a medium in which $TiO_2$ fine particles are distributed in UV curing resin 1 with varied composition ratios.

This refractive index distribution lens Ggi1 is a radial refractive index distribution lens in which its refractive index changes in a radial direction. A medium of the refractive index distribution lens Ggi1 is a mixture made by distributing the $TiO_2$ fine particles in the UV curing resin 1 with a volume ratio of 20.0% in the maximum and of 10.8% in the minimum. A composition ratio of the $TiO_2$ fine particles decreases in the radial direction from the optical axis.

Hence, the partial dispersion ratio for the g line and the F line of the refractive index distribution lens Ggi1 becomes maximum on the optical axis and minimum at an effective diameter position. In other words, θgF(pmax)=θgFR(0) and θgF(pmin)=θgFR(rea) are established. An equivalent partial dispersion ratio for the g line and F line becomes minimum on the optical axis and maximum at the effective diameter position. The position pmaxgi is an effective diameter position, and the position pmingi is a position on the optical axis.

Both a light incident surface and a light exit surface of the refractive index distribution lens Ggi1 used for the optical system of the fourth embodiment have curved shapes. The refractive index distribution lens Ggi1 is joined with another lens, and thus the interface between the atmosphere and the medium has a power. The medium has a positive power. An equivalent partial dispersion ratio for the g line and F line is larger than that of a general optical material.

The fourth embodiment includes the refractive index distribution lens Ggi1 in the third lens unit L3 among the lens units in the optical system on the image side with respect to the aperture stop SP. Thereby, the fourth embodiment well corrects a variety of aberrations, particularly a chromatic aberration.

Fifth Embodiment

An optical system according to a fifth embodiment (numerical example 5) illustrated in FIG. 9 includes, in order from an object side to an image side, a first lens unit L1 having a positive power, and a second lens unit L2 having a positive power. This optical system is a reducing and once inversely imaging optical system of a Gauss type having a focal length of 51 mm.

The fifth embodiment uses a refractive index distribution lens for each of the first lens unit L1 and the second lens unit L2. Each of the refractive index distribution lens Ggi1 in the first lens unit L1 and the refractive index distribution lens Ggi2 in the second lens unit L2 includes a medium in which $TiO_2$ fine particles are distributed in UV curing resin 1 with varied composition ratios.

Each of these refractive index distribution lenses Ggi1 and Ggi2 is a radial refractive index distribution lens in which its refractive index changes in the radial direction. A medium of the refractive index distribution lens Ggi1 is a mixture made by distributing the TiO$_2$ fine particles in the UV curing resin 1 with a volume ratio of 10.0% in the maximum and of 0.28% in the minimum. A medium of the refractive index distribution lens Ggi2 is a mixture made by distributing the TiO$_2$ fine particles in the UV curing resin 1 with a volume ratio of 20.0% in the maximum and of 2.74% in the minimum. A composition ratio of the TiO$_2$ fine particles decreases from the optical axis in the radial direction in each refractive index distribution lens.

Hence, the partial dispersion ratio for the g line and the F line of the refractive index distribution lens Ggi1 becomes maximum on the optical axis and minimum at an effective diameter position. In other words, θgF(pmax)=θgFR(0) and θgF(pmin)=θgFR(rea) are established. An equivalent partial dispersion ratio for the g line and F line becomes minimum on the optical axis and maximum at the effective diameter position. The position pmaxgi is an effective diameter position, and the position pmingi is a position on the optical axis.

The partial dispersion ratio for the g line and the F line of the refractive index distribution lens Ggi2 becomes maximum on the optical axis and minimum at an effective diameter position. In other words, θgF(pmax)=θgFR(0) and θgF(pmin)=θgFR(rea) are established. An equivalent partial dispersion ratio for the g line and F line becomes minimum on the optical axis and maximum at the effective diameter position. The position pmaxgi is a position on the optical axis, and the position pmingi is an effective diameter position.

Both a light incident surface and a light exit surface of each of the refractive index distribution lenses Ggi1 and Ggi2 for the fifth embodiment have planar shapes. Therefore, the interface between the atmosphere and the medium has substantially no power. The medium has a positive power. An equivalent partial dispersion ratio for the g line and F line is larger than that of a general optical material.

In comparison with the general optical material, the Gauss type of optical system can well correct a variety of aberrations, in particular a chromatic aberration by using a refractive index distribution lens having an anomalous dispersion characteristic for both lens units on the object side and on the image side with respect to the aperture stop SP.

Sixth Embodiment

An optical system according to a sixth embodiment (numerical example 6) illustrated in FIG. 11 includes, in order from an object side to an image side, a first lens unit L1 having a positive power, and a second lens unit L2 having a positive power. This optical system is a reducing and once inversely imaging optical system of a Gauss type having a focal length of 51 mm.

The sixth embodiment uses a refractive index distribution lens for the second lens unit L2. The refractive index distribution lens Ggi1 includes a medium in which ITO fine particles are distributed in inorganic glass 11 with varied composition ratios.

The refractive index distribution lens Ggi1 is a radial refractive index distribution lens in which its refractive index changes in the radial direction. A medium of the refractive index distribution lens Ggi1 is a mixture made by distributing the ITO fine particles in inorganic glass 11 with a volume ratio of 2.3% in the maximum and of 0.0% in the minimum. A composition ratio of the ITO fine particles increases in the radial direction from the optical axis.

The partial dispersion ratio for the g line and the F line of the refractive index distribution lens Ggi1 becomes maximum on the optical axis and minimum at an effective diameter position. In other words, θgF(pmax)=θgFR(0) and θgF(pmin)=θgFR(rea) are established. An equivalent partial dispersion ratio for the g line and F line becomes minimum on the optical axis and maximum at the effective diameter position. The position pmaxgi is a position on the optical axis, and the position pmingi is an effective diameter position.

Both a light incident surface and a light exit surface of each of the refractive index distribution lens Ggi1 for the sixth embodiment have planar shapes. Therefore, the interface between the atmosphere and the medium has substantially no power. The medium has a negative power. An equivalent partial dispersion ratio for the g line and F line is smaller than that of a general optical material.

In comparison with the general optical material, the Gauss type of optical system can well correct a variety of aberrations, in particular a chromatic aberration by using a refractive index distribution lens having an anomalous dispersion characteristic.

Seventh Embodiment

An optical system according to a seventh embodiment (numerical example 7) illustrated in FIG. 13 includes, in order from an object side to an image side, a first lens unit L1 that is fixed during focusing and has a positive power, a second lens unit L2 that is moved in the optical axis direction during focusing and has a negative refractive power, and a third lens unit L3 that is fixed during focusing and has a negative power. This optical system is a reducing and once inversely imaging optical system.

The optical system of the seventh embodiment includes a telephoto lens having a focal length of 294 mm and a telephoto ratio of 0.816.

The seventh embodiment uses for a first lens unit L1 a refractive index distribution lens Ggi1 that includes a medium in which TiO$_2$ fine particles are distributed in inorganic glass 11 with varied composition ratios.

The refractive index distribution lens Ggi1 is a radial refractive index distribution lens in which its refractive index changes in the radial direction. A medium of the refractive index distribution lens Ggi1 is a mixture made by distributing the TiO$_2$ fine particles in the inorganic glass 11 with a volume ratio of 15.0% in the maximum and of 0.0% in the minimum. A composition ratio of the TiO$_2$ fine particles decreases in the radial direction from the optical axis.

The partial dispersion ratio for the g line and the F line of the refractive index distribution lens Ggi1 becomes maximum on the optical axis and minimum at an effective diameter position. In other words, θgF(pmax)=θgFR(0) and θgF(pmin)=θgFR(rea) are established. An equivalent partial dispersion ratio for the g line and F line becomes minimum on the optical axis and maximum at the effective diameter position. The position pmaxgi is an effective diameter position, and the position pmingi is a position on the optical axis.

Both a light incident surface and a light exit surface of the refractive index distribution lens Ggi1 used for the optical system of the seventh embodiment have planar shapes. Therefore, the interface between the atmosphere and the medium has substantially no power. In addition, the medium has a positive power. An equivalent partial dispersion ratio for the g line and F line is larger than that of a general optical material.

The optical system of the seventh embodiment has a telephoto type power arrangement which has a positive power on the object side and a negative power on the image side with respect to the aperture stop SP. This embodiment includes the refractive index distribution lens Ggi1 in the first lens unit L1 arranged in front of the aperture stop SP and configured to make comparatively high a passing position of the paraxial light on the object side with respect to the aperture stop SP. Thereby, this embodiment well corrects a variety of aberrations, particularly a chromatic aberration.

Eighth Embodiment

An optical system according to an eighth embodiment (numerical example 8) illustrated in FIG. 15 includes, in order from an object side to an image side, a first lens unit L1 that is fixed during focusing and has a positive power, a second lens unit L2 that is moved in the optical axis direction during focusing and has a negative refractive power, and a third lens unit L3 that is fixed during focusing and has a negative power. This optical system is a reducing and once inversely imaging optical system.

The optical system of the eighth embodiment includes a telephoto lens having a focal length of 294 mm and a telephoto ratio of 0.816.

This embodiment uses for a first lens unit L1 a refractive index distribution lens Ggi1 that includes a medium in which $TiO_2$ fine particles are distributed in acrylic resin 21 with varied composition ratios.

The refractive index distribution lens Ggi1 is an axial refractive index distribution lens in which its refractive index changes in the optical axis direction. A medium of the refractive index distribution lens Ggi1 is a mixture made by distributing the $TiO_2$ fine particles in the acrylic resin 21 with a volume ratio of 6.96% in the maximum and of 0.0% in the minimum. A composition ratio of the $TiO_2$ fine particles increases in the optical axis direction from the object side to the image side.

The partial dispersion ratio for the g line and the F line of the refractive index distribution lens Ggi1 becomes minimum at a position closest to the object side and maximum at a position closest to the image side. In other words, $\theta gF(pmax)=\theta gFA(timg)$ and $\theta gF(pmin)=\theta gFA(tobj)$ are established. An equivalent partial dispersion ratio for the g line and F line becomes maximum at a position closest to the object side and minimum at a position closest to the image side. The position pmaxgi is located at a position closest to the object side, and the position pmingi is located at a position closest to the image side.

Both a light incident surface and a light exit surface of the refractive index distribution lens Ggi1 used for the optical system of the eighth embodiment have curved shapes. Therefore, the interface between the atmosphere and the medium has a power. The medium has a positive power. An equivalent partial dispersion ratio for the g line and F line is larger than that of a general optical material.

The optical system of the eighth embodiment has a telephoto type power arrangement which has a positive power on the object side and a negative power on the image side with respect to the aperture stop SP. This embodiment includes the refractive index distribution lens Ggi1 in the first lens unit L1 arranged in front of the aperture stop SP and configured to make comparatively high a passing position of the paraxial light on the object side with respect to the aperture stop SP. Thereby, this embodiment well corrects a variety of aberrations, particularly a chromatic aberration.

Ninth Embodiment

An optical system according to a ninth embodiment (numerical example 9) illustrated in FIG. 17 includes, in order from an object side to an image side, a first lens unit L1 that is fixed during focusing and has a positive power, a second lens unit L2 that is moved in the optical axis direction during focusing and has a negative refractive power, and a third lens unit L3 that is fixed during focusing and has a negative power. This optical system is a reducing and once inversely imaging optical system.

The optical system of the ninth embodiment includes a telephoto lens having a focal length of 294 mm and a telephoto ratio of 0.816.

The ninth embodiment uses for a first lens unit L1 a refractive index distribution lens Ggi1 that includes a medium in which ITO fine particles are distributed in inorganic glass 11 with varied composition ratios.

The refractive index distribution lens Ggi1 is an axial refractive index distribution lens in which its refractive index changes in the optical axis direction. A medium of the refractive index distribution lens Ggi1 is a mixture made by distributing the ITO fine particles in the inorganic glass 11 with a volume ratio of 10.0% in the maximum and of 2.78% in the minimum. A composition ratio of the ITO fine particles decreases in the optical axis direction from the object side to the image side.

The partial dispersion ratio for the g line and the F line of the refractive index distribution lens Ggi1 becomes minimum at a position closest to the object side and maximum at a position closest to the image side. In other words, $\theta gF(pmax)=\theta gFA(timg)$ and $\theta gF(pmin)=\theta gFA(tobj)$ are established. An equivalent partial dispersion ratio for the g line and F line becomes minimum at a position closest to the object side and maximum at a position closest to the image side. The position pmaxgi is located at a position closest to the image side, and the position pmingi is located at a position closest to the object side.

Both a light incident surface and a light exit surface of the refractive index distribution lens Ggi1 used for the optical system of the ninth embodiment have curved shapes. Therefore, the interface between the atmosphere and the medium has a power. The medium has a negative power. An equivalent partial dispersion ratio for the g line and F line is smaller than that of a general optical material.

The optical system of the ninth embodiment has a telephoto type power arrangement which has a positive power on the object side and a negative power on the image side with respect to the aperture stop SP. The ninth embodiment includes the refractive index distribution lens Ggi1 in the first lens unit L1 arranged in front of the aperture stop SP and configured to make comparatively high a passing position of the paraxial light on the object side with respect to the aperture stop SP. Thereby, this embodiment well corrects a variety of aberrations, particularly a chromatic aberration.

Tenth Embodiment

An optical system according to a tenth embodiment (numerical example 10) illustrated in FIG. 19 includes, in order from an object side to an image side, a first lens unit L1 having a positive power, and a second lens unit L2 having a positive power. This optical system is a reducing and once inversely imaging optical system of a Gauss type having a focal length of 51 mm.

The tenth embodiment uses a refractive index distribution lens Ggi1 for the second lens unit L2. The refractive index distribution lens Ggi1 includes a medium in which ITO fine particles are distributed in UV curing resin 1 with varied composition ratios.

The refractive index distribution lens Ggi1 is an axial refractive index distribution lens in which its refractive index changes in the optical axis direction. A medium of the refractive index distribution lens Ggi1 is a mixture made by distributing the ITO fine particles in the UV curing resin 1 with a volume ratio of 12.0% in the maximum and of 6.24% in the minimum. A composition ratio of the ITO fine particles decreases in the optical axis direction from the object side to the image side.

The partial dispersion ratio for the g line and the F line of the refractive index distribution lens Ggi1 becomes minimum at a position closest to the object side and maximum at a position closest to the image side. In other words, $\theta gF$ (pmax)=θgFA(timg) and θgF(pmin)=θgFA(tobj) are established. An equivalent partial dispersion ratio for the g line and F line becomes minimum at a position closest to the object side and maximum at a position closest to the image side. The position pmaxgi is a position closest to the image side, and the position pmingi is a position closest to the object side.

Both a light incident surface and a light exit surface of each of the refractive index distribution lens Ggi1 for the tenth embodiment have curved shapes. Therefore, the interface between the atmosphere and the medium has a power. The medium has a negative power. An equivalent partial dispersion ratio for the g line and F line is smaller than that of a general optical material.

In comparison with the general optical material, the Gauss type of optical system can well correct a variety of aberrations, in particular a chromatic aberration by using a refractive index distribution lens Ggi1 having an anomalous dispersion characteristic.

The refractive index distribution lens that satisfies the above Conditions (1)-(4) is not limited to the optical systems of first to tenth embodiments, and is applicable to a variety of optical systems.

Specific numerical data of each embodiment (numerical example) will now be illustrated. In each embodiment, "i" denotes a surface number counted from the object side. "Ri" denotes a radius of curvature of an i-th optical surface (i-th surface), and "Di" denotes an axial interval between the i-th surface and the (i+1)-th surface.

Ndi and νdi denote refractive indexes and an Abbe number of a material of the i-th optical element for the d line. When the i-th optical element is a refractive index distribution lens, it is written as Ngi and νdgi, and its wavelength dispersion of the refractive index distribution is separately indicated.

An aspheric shape is represented as follows, where X is a displacement amount from a surface vertex in the optical axis direction, h is a height from the optical axis in a direction orthogonal to the optical axis, r is a paraxial radius of curvature, k is a conic constant, and B, C, D, and E, etc. are aspheric coefficients of each order:

$$x(h) = \frac{(1/r)h^2}{1+\sqrt{\{1-(1+k)(h/r^2)\}}} + Bh^4 + Ch^6 + Dh^8 + Eh^{10} + \ldots \qquad \text{EQUATION 3}$$

"E±XX" in each numerical value means "$\times 10^{\pm xx}$".

Table 11 illustrates numerical values of the refractive indexes, Abbe numbers, and partial dispersion ratios, etc. of an optical material used for the refractive index distribution lens for the d line, the g line, the C line, and the F line. Table 12 illustrates a material characteristic of the refractive index distribution of each embodiment.

Each embodiment assumes the following equations for the refractive index distribution.

Radial Refractive Index Distribution $$n_{r\lambda}(r) = N_{r\lambda 0} + N_{r\lambda 2}r^2 + N_{r\lambda 4}r^4 \qquad \text{EQUATION 4}$$

Axial Refractive Index Distribution $$n_{a\lambda}(Z) = N_{a\lambda 0} + N_{a\lambda 1}z + N_{a\lambda 2}z^2 \qquad \text{EQUATION 5}$$

The approximations of the refractive index distributions are not limited to the above equations, and an arbitrary approximation may be adopted.

In each embodiment, coefficients of the approximations of the refractive index distributions for the d line, the g line, the C line, the F line, and the e line (546.1 nm) will be described as a refractive index distribution characteristic.

TABLE 1

(NUMERICAL EXAMPLE 1)

| | | |
|---|---|---|
| focal length | | 294.00 |
| F number | | 4.06 |
| angle of view | | 4.29 |
| image point | | 21.64 |
| lens overall length | | 236.3 |
| BF | | 87.1 |

| surface number | radius of curvature | surface separation | Nd | νd | effective diameter |
|---|---|---|---|---|---|
| 1 | ∞ | 1.64 | Ngi | νdgi | 71.27 |
| 2 | ∞ | 0.15 | | | 71.28 |
| 3 | 179.203 | 9.58 | 1.48749 | 70.2 | 71.31 |
| 4 | −152.401 | 0.18 | | | 71.08 |
| 5 | 121.218 | 6.02 | 1.57250 | 57.7 | 67.04 |
| 6 | 821.892 | 3.70 | | | 66.08 |
| 7 | −193.280 | 3.40 | 1.88300 | 40.8 | 65.93 |
| 8 | 597.468 | 18.01 | | | 64.50 |
| 9 | 77.656 | 7.50 | 1.48749 | 70.2 | 58.02 |
| 10 | 15272.385 | 9.94 | | | 57.16 |
| 11 | 64.136 | 3.89 | 1.75520 | 27.5 | 47.22 |
| 12 | 48.246 | 10.84 | | | 43.82 |
| 13 (stop) | ∞ | 0.00 | | | 40.36 |
| 14 | ∞ | 4.00 | | | 40.86 |
| 15 | 436.492 | 4.00 | 1.80518 | 25.4 | 38.00 |
| 16 | −78.435 | 2.00 | 1.88300 | 40.8 | 37.57 |
| 17 | 81.708 | 20.94 | | | 35.74 |
| 18 | 176.844 | 1.60 | 1.68893 | 31.1 | 32.62 |
| 19 | 29.305 | 8.40 | 1.65160 | 58.5 | 31.69 |
| 20 | −76.744 | 2.35 | | | 31.38 |
| 21 | 39.723 | 7.01 | 1.85026 | 32.3 | 27.93 |
| 22 | −47.520 | 1.50 | 1.83481 | 42.7 | 26.87 |
| 23 | 26.468 | 4.55 | | | 24.15 |
| 24 | −51.428 | 1.50 | 1.75500 | 52.3 | 24.16 |
| 25 | 109.994 | 5.51 | | | 25.01 |
| 26 | 63.080 | 7.00 | 1.54814 | 45.8 | 29.00 |

TABLE 1-continued (NUMERICAL EXAMPLE 1)

| | | | | | |
|---|---|---|---|---|---|
| 27 | −31.278 | 4.00 | 1.88300 | 40.8 | 29.34 |
| 28 | −54.605 | | | | 31.21 |

Refractive index distribution characteristic

| first surface | g line | F line | e line | d line | C line |
|---|---|---|---|---|---|
| Nr0 | 1.53706 | 1.53133 | 1.52658 | 1.52415 | 1.52116 |
| Nr2 | 1.7900E−05 | 1.6206E−05 | 1.4459E−05 | 1.3327E−05 | 1.1386E−05 |
| Nr4 | −1.0212E−10 | −8.4178E−11 | −6.7344E−11 | −5.7378E−11 | −4.2056E−11 |

TABLE 2

(NUMERICAL EXAMPLE 2)

| | |
|---|---|
| focal length | 294.00 |
| F number | 4.14 |
| angle of view | 4.08 |
| image point | 21.64 |
| lens overall length | 225.00 |
| BF | 83.12 |

| surface number | r | d | nd | vd | effective diameter |
|---|---|---|---|---|---|
| 1 | ∞ | 1.83 | Ngi1 | vdgi1 | 71.24 |
| 2 | ∞ | 0.15 | | | 71.25 |
| 3 | 151.611 | 8.68 | 1.48749 | 70.2 | 71.28 |
| 4 | −186.059 | 2.00 | Ngi2 | vdgi2 | 71.12 |
| 5* | −180.567 | 0.15 | | | 70.85 |
| 6 | 107.280 | 6.34 | 1.48749 | 70.2 | 66.83 |
| 7 | 569.990 | 7.91 | | | 65.82 |
| 8 | −204.577 | 3.40 | 1.85026 | 32.3 | 62.51 |
| 9 | 403.377 | 1.11 | | | 60.98 |
| 10 | 67.565 | 7.88 | 1.48749 | 70.2 | 59.09 |
| 11 | 503.354 | 12.32 | | | 58.14 |
| 12 | 51.880 | 3.00 | 1.67003 | 47.2 | 46.31 |
| 13 | 39.579 | 10.27 | | | 43.11 |
| 14 (stop) | ∞ | 4.00 | | | 40.63 |
| 15 | 186.289 | 4.00 | 1.75520 | 27.5 | 38.00 |
| 16 | −102.544 | 2.00 | 1.88300 | 40.8 | 37.50 |
| 17 | 81.708 | 28.25 | | | 35.61 |
| 18 | 141.821 | 2.35 | 1.80809 | 22.8 | 29.34 |
| 19 | 33.233 | 6.77 | 1.63930 | 44.9 | 28.29 |
| 20 | −74.880 | 0.15 | | | 28.39 |
| 21 | 64.467 | 6.80 | 1.85026 | 32.3 | 28.00 |
| 22 | −51.309 | 2.21 | 1.73400 | 51.5 | 27.06 |
| 23 | 27.021 | 6.97 | | | 24.74 |
| 24 | −35.482 | 1.50 | 1.62041 | 60.3 | 25.02 |
| 25 | −5499.714 | 2.04 | | | 26.48 |
| 26 | 57.920 | 7.00 | 1.56732 | 42.8 | 29.00 |
| 27 | −28.967 | 2.80 | 1.88300 | 40.8 | 29.23 |
| 28 | −55.832 | | | | 30.82 |

Aspheric data

| | k | B | C | D | E |
|---|---|---|---|---|---|
| fifth surface | 3.6672E−03 | −7.9527E−11 | −7.7244E−14 | 2.5256E−16 | −5.2268E−20 |

Refractive index distribution characteristic

| | g line | F line | e line | d line | C line |
|---|---|---|---|---|---|
| first surface | | | | | |
| Nr0 | 1.67532 | 1.65604 | 1.64203 | 1.63555 | 1.62807 |
| Nr2 | 1.1152E−05 | 1.0214E−05 | 9.0136E−06 | 8.1409E−06 | 6.5273E−06 |
| Nr4 | −3.6686E−11 | −3.1159E−11 | −2.4500E−11 | −2.0083E−11 | −1.2992E−11 |
| fourth surface | | | | | |
| Nr0 | 1.57249 | 1.56326 | 1.55650 | 1.55324 | 1.54936 |
| Nr2 | −2.7862E−05 | −2.5129E−05 | −2.3564E−05 | −2.2918E−05 | −2.2218E−05 |
| Nr4 | −2.5493E−10 | −2.0797E−10 | −1.8335E−10 | −1.7367E−10 | −1.6351E−10 |

TABLE 3

(NUMERICAL EXAMPLE 3)

| | WIDE-ANGLE END | INTERMEDIATE | TELEPHOTO END |
|---|---|---|---|
| zoom ratio | | 11.59 | |
| focal length | 6.15 | 20.45 | 71.28 |
| F number | 2.73 | 3.40 | 3.08 |
| angle of view | 31.63 | 10.59 | 3.30 |
| image point | 3.60 | 3.60 | 3.60 |
| lens overall length | 82.44 | 86.28 | 90.00 |
| BF | 10.70 | 13.87 | 8.03 |
| d6 | 0.80 | 18.16 | 31.50 |
| d12 | 27.74 | 13.60 | 1.35 |
| d13 | 6.59 | 1.20 | 3.46 |
| d19 | 1.10 | 1.27 | 6.86 |

| surface number | r | d | nd | vd | effective diameter |
|---|---|---|---|---|---|
| 1 | 84.187 | 2.18 | 1.85026 | 32.3 | 30.53 |
| 2 | 31.281 | 1.76 | Ngi | vdgi | 28.98 |
| 3 | 32.572 | 4.94 | 1.48749 | 70.2 | 28.81 |
| 4 | −193.412 | 0.15 | | | 28.72 |
| 5 | 31.897 | 2.87 | 1.74100 | 52.6 | 27.95 |
| 6 | 203.162 | (Variable) | | | 27.89 |
| 7 | 56.434 | 0.90 | 1.83481 | 42.7 | 16.97 |
| 8 | 8.593 | 4.02 | | | 13.25 |
| 9 | −29.285 | 0.75 | 1.55880 | 62.5 | 13.20 |
| 10 | 28.445 | 0.70 | | | 13.18 |
| 11 | 15.945 | 1.79 | 1.92286 | 18.9 | 13.55 |
| 12 | 35.607 | (Variable) | | | 13.26 |
| 13 (stop) | ∞ | (Variable) | | | 6.33 |
| 14* | 7.231 | 3.05 | 1.55880 | 62.5 | 9.00 |
| 15 | −83.843 | 2.17 | | | 8.60 |
| 16 | 63.445 | 0.70 | 1.85026 | 32.3 | 8.10 |
| 17 | 7.087 | 0.88 | | | 7.90 |
| 18 | 23.759 | 1.70 | 1.75500 | 52.3 | 8.10 |
| 19 | −63.787 | (Variable) | | | 8.40 |
| 20 | 14.419 | 2.70 | 1.73400 | 51.5 | 9.78 |
| 21 | −13.058 | 0.80 | 1.67270 | 32.1 | 9.62 |
| 22 | 51.544 | | | | 9.19 |

Aspheric data

| | k | B | C | D | E |
|---|---|---|---|---|---|
| fourteenth surface | −4.5356E−01 | −5.6922E−05 | −3.1787E−07 | −1.0665E−08 | 1.7447E−10 |

Refractive index distribution characteristic

| second surface | g line | F line | e line | d line | C line |
|---|---|---|---|---|---|
| Nr0 | 1.53706 | 1.53133 | 1.52658 | 1.52415 | 1.52117 |
| Nr2 | 7.1670E−05 | 6.4709E−05 | 5.7655E−05 | 5.3288E−05 | 4.5630E−05 |
| Nr4 | −1.5449E−09 | −1.2729E−09 | −1.0211E−09 | −8.7763E−10 | −6.5006E−10 |

TABLE 4

(NUMERICAL EXAMPLE 4)

| | |
|---|---|
| focal length | 24.48 |
| F number | 2.86 |
| angle of view | 38.26 |
| image point | 21.64 |
| lens overall length | 92.00 |
| BF | 38.00 |

| surface number | r | d | nd | vd | effective diameter |
|---|---|---|---|---|---|
| 1 | 77.921 | 3.48 | 1.61800 | 63.3 | 43.52 |
| 2 | 269.364 | 0.15 | | | 42.04 |
| 3 | 39.103 | 1.00 | 1.83481 | 42.7 | 33.92 |
| 4 | 16.390 | 7.08 | | | 26.97 |
| 5 | 18.456 | 2.62 | 1.80809 | 22.8 | 23.10 |
| 6 | 25.750 | 4.09 | | | 21.88 |

TABLE 4-continued (NUMERICAL EXAMPLE 4)

| | | | | | |
|---|---|---|---|---|---|
| 7 | 19.071 | 0.90 | 1.83481 | 42.7 | 16.60 |
| 8 | 10.225 | 2.90 | | | 14.27 |
| 9 | 58.071 | 3.47 | 1.75520 | 27.5 | 13.95 |
| 10 | −337.057 | 0.37 | | | 12.38 |
| 11 | 53.775 | 5.25 | 1.64769 | 33.8 | 11.62 |
| 12 | 26.907 | 2.43 | | | 12.14 |
| 13 (stop) | ∞ | 1.52 | | | 13.09 |
| 14 | 40.640 | 4.72 | 1.77900 | 49.7 | 14.27 |
| 15 | −17.532 | 2.93 | | | 14.60 |
| 16 | −19.182 | 3.27 | 1.84887 | 23.9 | 12.84 |
| 17 | 41.402 | 1.09 | Ngi | vdgi | 14.52 |
| 18 | 44.682 | 1.32 | | | 15.36 |
| 19 | −68.757 | 2.62 | 1.62041 | 60.3 | 15.73 |
| 20 | −18.094 | 0.15 | | | 16.80 |
| 21 | −279.033 | 2.64 | 1.68385 | 55.1 | 19.03 |
| 22 | −29.370 | | | | 19.71 |

Refractive index distribution characteristic

| seventeenth surface | g line | F line | e line | d line | C line |
|---|---|---|---|---|---|
| Nr0 | 1.75983 | 1.73307 | 1.71620 | 1.70874 | 1.70031 |
| Nr2 | −2.0780E−03 | −1.8933E−03 | −1.7858E−03 | −1.7410E−03 | −1.6922E−03 |
| Nr4 | −1.4874E−06 | −1.2332E−06 | −1.0974E−06 | −1.0435E−06 | −9.8649E−07 |

TABLE 5

(NUMERICAL EXAMPLE 5)

| | |
|---|---|
| focal length | 51.70 |
| F number | 1.39 |
| angle of view | 21.74 |
| image point | 21.64 |
| lens overall length | 96.15 |
| BF | 37.50 |

| surface number | r | d | nd | vd | effective diameter |
|---|---|---|---|---|---|
| 1 | 59.72 | 4.13 | 1.77250 | 49.6 | 39.66 |
| 2 | 391.032 | 0.15 | | | 39.29 |
| 3 | 31.721 | 6.00 | 1.85026 | 32.3 | 36.73 |
| 4 | 48.687 | 1.12 | | | 33.95 |
| 5 | 67.751 | 2.50 | 1.76182 | 26.5 | 33.75 |
| 6 | 22.218 | 7.07 | | | 29.24 |
| 7 | ∞ | 0.42 | Ngi1 | vdgi1 | 29.02 |
| 8 | ∞ | 0.50 | | | 28.98 |
| 9 (stop) | ∞ | 5.93 | | | 28.91 |
| 10 | ∞ | 1.64 | Ngi2 | vdgi2 | 28.03 |
| 11 | ∞ | 4.21 | | | 27.83 |
| 12 | −26.100 | 1.20 | 1.78472 | 25.7 | 27.79 |
| 13 | 74.157 | 7.07 | 1.88300 | 40.8 | 30.60 |
| 14 | −31.171 | 1.23 | | | 31.09 |
| 15 | −25.794 | 1.20 | 1.67270 | 32.1 | 31.02 |
| 16 | 76.542 | 7.50 | 1.88300 | 40.8 | 35.20 |
| 17 | −40.999 | 1.60 | | | 36.18 |
| 18* | 218.520 | 5.18 | 1.77250 | 49.6 | 40.18 |
| 19 | −62.802 | | | | 40.60 |

Aspheric data

| | k | B | C | D | E |
|---|---|---|---|---|---|
| eighteenth surface | −7.1171E+01 | −1.7154E−06 | 2.1331E−09 | −7.5966E−12 | 6.8613E−15 |

Refractive index distribution characteristic

| | g line | F line | e line | d line | C line |
|---|---|---|---|---|---|
| seventh surface | | | | | |
| Nr0 | 1.65222 | 1.63533 | 1.62417 | 1.61909 | 1.61323 |
| Nr2 | −4.9341E−04 | −4.4706E−04 | −4.2032E−04 | −4.0924E−04 | −3.9720E−04 |
| Nr4 | −8.1634E−08 | −6.7083E−08 | −5.9389E−08 | −5.6351E−08 | −5.3152E−08 |

TABLE 5-continued (NUMERICAL EXAMPLE 5)

tenth surface

| | | | | | |
|---|---|---|---|---|---|
| Nr0 | 1.75983 | 1.73307 | 1.71620 | 1.70874 | 1.70031 |
| Nr2 | −9.2358E−04 | −8.4148E−04 | −7.9369E−04 | −7.7379E−04 | −7.5211E−04 |
| Nr4 | −2.9380E−07 | −2.4359E−07 | −2.1677E−07 | −2.0612E−07 | −1.9486E−07 |

TABLE 6

(NUMERICAL EXAMPLE 6)

| | |
|---|---|
| focal length | 51.70 |
| F number | 1.30 |
| angle of view | 22.84 |
| image point | 21.64 |
| lens overall length | 98.01 |
| BF | 37.51 |

| surface number | r | d | nd | vd | effective diameter |
|---|---|---|---|---|---|
| 1 | 71.208 | 3.78 | 1.78000 | 50.0 | 39.66 |
| 2 | 806.522 | 0.15 | | | 39.36 |
| 3 | 31.790 | 6.00 | 1.88123 | 37.9 | 36.94 |
| 4 | 47.156 | 1.06 | | | 34.14 |
| 5 | 62.790 | 2.37 | 1.64017 | 32.7 | 33.96 |
| 6 | 21.990 | 8.69 | | | 29.51 |
| 7 (stop) | ∞ | 4.72 | | | 28.85 |
| 8 | ∞ | 5.00 | Ngi | vdgi | 27.80 |
| 9 | ∞ | 4.34 | | | 27.10 |
| 10 | −24.176 | 1.94 | 1.69192 | 29.8 | 27.05 |
| 11 | 159.530 | 8.50 | 1.88500 | 41.0 | 29.86 |
| 12 | −32.556 | 0.72 | | | 31.19 |
| 13 | −29.413 | 1.60 | 1.72810 | 27.1 | 31.12 |
| 14 | −2008.000 | 5.55 | 1.84993 | 43.4 | 36.48 |
| 15 | −42.000 | 0.15 | | | 37.57 |
| 16* | 138.393 | 5.93 | 1.88500 | 41.0 | 42.53 |
| 17 | −70.581 | | | | 42.89 |

Aspheric data

| | k | B | C | D | E |
|---|---|---|---|---|---|
| sixteenth surface | −1.5812E+00 | −1.4579E−06 | 1.8057E−09 | −3.9492E−12 | 3.2039E−15 |

Refractive index distribution characteristic

| eighth surface | g line | F line | e line | d line | C line |
|---|---|---|---|---|---|
| Nr0 | 1.52621 | 1.52191 | 1.51825 | 1.51633 | 1.51386 |
| Nr2 | 5.5357E−05 | 5.0031E−05 | 4.4600E−05 | 4.1114E−05 | 3.5191E−05 |
| Nr4 | −9.4381E−10 | −7.7741E−10 | −6.2287E−10 | −5.3196E−10 | −3.9291E−10 |

TABLE 7

(NUMERICAL EXAMPLE 7)

| | |
|---|---|
| focal length | 293.99 |
| F number | 4.14 |
| angle of view | 3.64 |
| image point | 21.64 |
| lens overall length | 240.00 |
| BF | 85.49 |

| surface number | r | d | nd | vd | effective diameter |
|---|---|---|---|---|---|
| 1 | ∞ | 1.29 | Ngi | vdgi | 71.25 |
| 2 | ∞ | 0.15 | | | 71.25 |
| 3 | 186.219 | 9.35 | 1.51741 | 57.7 | 71.19 |
| 4 | −157.573 | 0.15 | | | 70.92 |
| 5 | 120.851 | 6.18 | 1.57071 | 45.0 | 66.65 |
| 6 | 1149.692 | 3.49 | | | 65.65 |

TABLE 7-continued (NUMERICAL EXAMPLE 7)

| | | | | | |
|---|---|---|---|---|---|
| 7 | −192.596 | 3.40 | 1.84441 | 26.1 | 65.47 |
| 8 | 278.314 | 19.83 | | | 63.56 |
| 9 | 72.730 | 9.42 | 1.51105 | 57.7 | 57.69 |
| 10 | 1636.856 | 11.26 | | | 56.03 |
| 11 | 66.222 | 3.00 | 1.62917 | 34.2 | 45.80 |
| 12 | 45.425 | 9.24 | | | 42.80 |
| 13 (stop) | ∞ | 0.00 | | | 40.42 |
| 14 | ∞ | 4.00 | | | 40.92 |
| 15 | 190.555 | 3.75 | 1.75168 | 26.6 | 38.00 |
| 16 | −117.898 | 2.00 | 1.88500 | 41.0 | 37.53 |
| 17 | 81.708 | 27.22 | | | 35.82 |
| 18 | 151.123 | 1.60 | 1.67146 | 30.8 | 30.82 |
| 19 | 29.394 | 8.40 | 1.64104 | 51.6 | 29.85 |
| 20 | −75.901 | 2.75 | | | 29.33 |
| 21 | 53.249 | 5.11 | 1.87569 | 34.4 | 28.00 |
| 22 | −52.435 | 1.50 | 1.83912 | 35.3 | 27.50 |
| 23 | 30.701 | 4.88 | | | 25.22 |
| 24 | −41.375 | 1.50 | 1.71249 | 53.3 | 25.23 |
| 25 | 1198.107 | 4.03 | | | 26.25 |
| 26 | 81.507 | 7.00 | 1.65694 | 31.9 | 29.00 |
| 27 | −28.732 | 4.00 | 1.85997 | 42.7 | 29.27 |
| 28 | −78.725 | | | | 30.97 |

Refractive index distribution characteristic

| first surface | g line | F line | e line | d line | C line |
|---|---|---|---|---|---|
| Nr0 | 1.69859 | 1.67764 | 1.66436 | 1.65844 | 1.65165 |
| Nr2 | −1.2979E−04 | −1.1784E−04 | −1.1088E−04 | −1.0798E−04 | −1.0483E−04 |
| Nr4 | −5.7733E−09 | −4.7534E−09 | −4.2084E−09 | −3.9922E−09 | −3.7648E−09 |

TABLE 8

(NUMERICAL EXAMPLE 8)

| | |
|---|---|
| focal length | 294.00 |
| F number | 4.14 |
| angle of view | 3.86 |
| image point | 21.64 |
| lens overall length | 239.98 |
| BF | 87.15 |

| surface number | r | d | nd | vd | effective diameter |
|---|---|---|---|---|---|
| 1 | 200.331 | 9.05 | 1.48749 | 70.2 | 71.21 |
| 2 | −143.674 | 2.50 | Ngi | vdgi | 71.04 |
| 3 | −143.674 | 0.15 | | | 70.71 |
| 4 | 113.240 | 6.39 | 1.56384 | 60.7 | 66.37 |
| 5 | 976.586 | 3.93 | | | 65.37 |
| 6 | −168.592 | 3.40 | 1.85026 | 32.3 | 65.21 |
| 7 | 583.173 | 27.68 | | | 63.69 |
| 8 | 76.220 | 7.56 | 1.48749 | 70.2 | 54.59 |
| 9 | −607.692 | 6.13 | | | 53.75 |
| 10 | 71.492 | 3.00 | 1.59270 | 35.3 | 46.08 |
| 11 | 46.263 | 9.17 | | | 42.92 |
| 12 (stop) | ∞ | 0.00 | | | 40.41 |
| 13 | ∞ | 4.00 | | | 40.88 |
| 14 | 288.232 | 3.55 | 1.80518 | 25.4 | 37.97 |
| 15 | −108.993 | 2.00 | 1.88300 | 40.8 | 37.52 |
| 16 | 81.708 | 24.81 | | | 35.75 |
| 17 | 199.163 | 1.60 | 1.67270 | 32.1 | 31.03 |
| 18 | 26.710 | 8.39 | 1.63930 | 44.9 | 30.01 |
| 19 | −71.592 | 0.15 | | | 29.65 |
| 20 | 38.018 | 5.77 | 1.85026 | 32.3 | 28.00 |
| 21 | −55.937 | 1.50 | 1.80100 | 35.0 | 27.37 |
| 22 | 26.503 | 4.75 | | | 24.41 |
| 23 | −48.399 | 1.50 | 1.88300 | 40.8 | 24.40 |
| 24 | 228.324 | 6.63 | | | 25.13 |
| 25 | 83.174 | 6.04 | 1.59270 | 35.3 | 29.00 |
| 26 | −31.669 | 3.04 | 1.88300 | 40.8 | 29.21 |
| 27 | −65.343 | | | | 30.66 |

TABLE 8-continued

(NUMERICAL EXAMPLE 8)

Refractive index distribution characteristic

| second surface | g line | F line | e line | d line | C line |
|---|---|---|---|---|---|
| N0 | 1.50249 | 1.49774 | 1.49376 | 1.49172 | 1.48918 |
| N1 | 1.2551E−02 | 1.1318E−02 | 1.0611E−02 | 1.0318E−02 | 1.0001E−02 |
| N2 | −4.6717E−05 | −3.8498E−05 | −3.4128E−05 | −3.2395E−05 | −3.0568E−05 |

TABLE 9

(NUMERICAL EXAMPLE 9)

| | |
|---|---|
| focal length | 294.01 |
| F number | 4.01 |
| angle of view | 4.33 |
| image point | 21.64 |
| lens overall length | 240.00 |
| BF | 91.21 |

| surface number | r | d | nd | vd | effective diameter |
|---|---|---|---|---|---|
| 1 | 194.187 | 9.42 | 1.48700 | 70.4 | 71.24 |
| 2 | −136.073 | 2.50 | Ngi | vdgi | 71.08 |
| 3 | −136.073 | 0.15 | | | 70.86 |
| 4 | 122.373 | 6.47 | 1.48700 | 70.4 | 66.54 |
| 5 | 5488.945 | 3.73 | | | 65.57 |
| 6 | −160.312 | 3.40 | 1.86782 | 42.1 | 65.38 |
| 7 | 1072.228 | 20.89 | | | 64.13 |
| 8 | 68.432 | 10.00 | 1.48700 | 70.4 | 56.95 |
| 9 | 3376.375 | 6.95 | | | 55.10 |
| 10 | 59.172 | 3.81 | 1.61030 | 36.2 | 46.72 |
| 11 | 42.057 | 9.78 | | | 42.95 |
| 12 (stop) | ∞ | 0.00 | | | 40.38 |
| 13 | ∞ | 4.00 | | | 40.85 |
| 14 | 390.620 | 3.97 | 1.81048 | 24.6 | 37.95 |
| 15 | −81.171 | 2.00 | 1.88500 | 41.0 | 37.51 |
| 16 | 81.708 | 21.54 | | | 35.64 |
| 17 | 180.339 | 1.60 | 1.67769 | 30.4 | 32.00 |
| 18 | 29.357 | 8.40 | 1.62363 | 59.9 | 31.05 |
| 19 | −74.633 | 0.60 | | | 30.71 |
| 20 | 36.090 | 5.39 | 1.86523 | 29.0 | 28.06 |
| 21 | −80.670 | 1.50 | 1.77045 | 40.7 | 27.33 |
| 22 | 25.016 | 4.59 | | | 24.42 |
| 23 | −62.468 | 1.50 | 1.84013 | 44.2 | 24.41 |
| 24 | 90.892 | 6.62 | | | 24.96 |
| 25 | 61.999 | 6.43 | 1.55093 | 45.6 | 29.00 |
| 26 | −32.050 | 3.41 | 1.88500 | 41.0 | 29.19 |
| 27 | −64.132 | | | | 30.73 |

Refractive index distribution characteristic

| second surface | g line | F line | e line | d line | C line |
|---|---|---|---|---|---|
| Na0 | 1.57195 | 1.56330 | 1.55520 | 1.55042 | 1.54308 |
| Na1 | −4.5064E−03 | −4.0836E−03 | −3.6504E−03 | −3.3711E−03 | −2.8944E−03 |
| Na2 | −6.7526E−06 | −5.5530E−06 | −4.4417E−06 | −3.7894E−06 | −2.7936E−06 |

TABLE 10

(NUMERICAL EXAMPLE 10)

| | |
|---|---|
| focal length | 51.70 |
| F number | 1.30 |
| angle of view | 22.79 |
| image point | 21.64 |
| lens overall length | 98.00 |
| BF | 37.50 |

| surface number | r | d | nd | vd | effective diameter |
|---|---|---|---|---|---|
| 1 | 62.246 | 3.90 | 1.78000 | 50.0 | 39.66 |
| 2 | 352.986 | 0.15 | | | 39.31 |
| 3 | 31.116 | 6.00 | 1.87156 | 31.7 | 36.86 |

TABLE 10-continued (NUMERICAL EXAMPLE 10)

| | | | | | |
|---|---|---|---|---|---|
| 4 | 42.057 | 0.98 | | | 33.78 |
| 5 | 52.521 | 2.50 | 1.72943 | 27.0 | 33.61 |
| 6 | 21.957 | 8.63 | | | 29.36 |
| 7 (stop) | ∞ | 12.69 | | | 28.83 |
| 8* | −23.658 | 1.40 | Ngi | νdgi | 27.37 |
| 9 | −27.571 | 1.20 | 1.63827 | 32.8 | 28.13 |
| 10 | 106.839 | 8.38 | 1.88500 | 41.0 | 30.76 |
| 11 | −31.867 | 0.89 | | | 31.88 |
| 12 | −28.313 | 1.20 | 1.70124 | 28.5 | 32.01 |
| 13 | 263.741 | 6.70 | 1.88500 | 41.0 | 38.48 |
| 14 | −42.979 | 0.15 | | | 39.45 |
| 15* | 155.935 | 5.74 | 1.78000 | 50.0 | 43.31 |
| 16 | −72.370 | (Variable) | | | 43.63 |

Aspheric data

| | k | B | C | D | E |
|---|---|---|---|---|---|
| eighth surface | 4.5161E−02 | 1.0357E−07 | −6.0253E−10 | 4.8928E−12 | 1.9565E−14 |
| fifteenth surface | −4.6127E+00 | −1.6205E−06 | 1.9989E−09 | −4.9032E−12 | 3.8956E−15 |

Refractive index distribution characteristic

| eighth surface | g line | F line | e line | d line | C line |
|---|---|---|---|---|---|
| Na0 | 1.59016 | 1.57948 | 1.56961 | 1.56385 | 1.55515 |
| Na1 | −5.2200E−03 | −4.7405E−03 | −4.2430E−03 | −3.9192E−03 | −3.3607E−03 |
| Na2 | −9.0168E−06 | −7.4529E−06 | −5.9798E−06 | −5.1045E−06 | −3.7538E−06 |

TABLE 11

| | UV curing resin 1 | UV curing resin 2 | inorganic glass 11 | acrylic resin 21 | ITO | TiO$_2$ |
|---|---|---|---|---|---|---|
| Nd | 1.5241 | 1.6356 | 1.5163 | 1.4917 | 1.8571 | 2.3038 |
| Ng | 1.5371 | 1.6753 | 1.5262 | 1.5025 | 1.9924 | 2.4568 |
| NC | 1.5212 | 1.6281 | 1.5139 | 1.4892 | 1.7979 | 2.2803 |
| NF | 1.5313 | 1.6560 | 1.5219 | 1.4977 | 1.9487 | 2.3745 |
| νd | 51.55 | 22.78 | 64.14 | 57.44 | 5.69 | 13.84 |
| θgd | 1.2695 | 1.4229 | 1.2273 | 1.2570 | 0.8976 | 1.6241 |
| θgF | 0.5631 | 0.6918 | 0.5342 | 0.5537 | 0.2901 | 0.8731 |
| Δθgd | 0.0195 | 0.0838 | −0.0012 | 0.0181 | −0.5287 | 0.2430 |
| ΔθgF | 0.0111 | 0.0677 | −0.0014 | 0.0104 | −0.4072 | 0.2141 |

TABLE 12

| | first embodiment | second embodiment Ggi1 | second embodiment Ggi2 | third embodiment | fourth embodiment |
|---|---|---|---|---|---|
| rea | 35.64 | 35.62 | 35.56 | 14.49 | 7.26 |
| θgF(0) | 0.5631 | 0.6895 | 0.6645 | 0.5631 | 0.8168 |
| θgF(rea) | 0.4838 | 0.6274 | 0.5623 | 0.5072 | 0.7598 |
| \|θgF(rea) − θgF(0)\| | 0.0793 | 0.0621 | 0.1022 | 0.0559 | 0.0570 |
| νdgiR(rea) | 2.781 | 2.215 | 7.798 | 2.803 | 8.389 |
| θgdgi(rea) | 0.9474 | 0.8161 | 1.7006 | 0.9627 | 1.6835 |
| θgFgi(rea) | 0.3505 | 0.2541 | 0.9409 | 0.3643 | 0.9254 |
| θgFgi(pmingi) | 0.3502 | 0.2530 | 0.9389 | 0.3655 | 0.9186 |
| \|θgFgi(pmaxgi) − θgFgi(pmingi)\| | 0.0003 | 0.0011 | 0.0020 | 0.0012 | 0.0068 |
| Δθgdgi(rea) | −0.4967 | −0.6315 | 0.2867 | −0.4812 | 0.2730 |
| ΔθgFgi(rea) | −0.3619 | −0.4614 | 0.2541 | −0.3480 | 0.2415 |
| \|ΔθgFs − ΔθgFm\| | 0.4183 | 0.4749 | 0.2029 | 0.4183 | 0.2029 |

| | fifth embodiment Ggi1 | fifth embodiment Ggi2 | sixth embodiment | seventh embodiment |
|---|---|---|---|---|
| rea | 14.51 | 14.02 | 13.90 | 35.63 |
| θgF(0) | 0.7646 | 0.8168 | 0.5342 | 0.8059 |
| θgF(rea) | 0.5912 | 0.6527 | 0.4882 | 0.5257 |
| \|θgF(rea) − θgF(0)\| | 0.1734 | 0.1641 | 0.0459 | 0.2803 |
| νdgiR(rea) | 7.976 | 8.230 | 2.778 | 7.921 |
| θgdgi(rea) | 1.6951 | 1.6879 | 0.9593 | 1.6869 |
| θgFgi(rea) | 0.9359 | 0.9294 | 0.3586 | 0.9279 |
| θgFgi(pmingi) | 0.9292 | 0.9185 | 0.3593 | 0.9181 |
| \|θgFgi(pmaxgi) − θgFgi(pmingi)\| | 0.0067 | 0.0109 | 0.0007 | 0.0098 |
| Δθgd(rea) | 0.2822 | 0.2765 | −0.4848 | 0.2737 |

TABLE 12-continued

| | | | | |
|---|---|---|---|---|
| ΔθgF(rea) | 0.2499 | 0.2447 | −0.3539 | 0.2417 |
| \|ΔθgFs − ΔθgFm\| | 0.2029 | 0.2029 | 0.4058 | 0.2154 |

| | eighth embodiment | ninth embodiment | tenth embodiment |
|---|---|---|---|
| \|timg − iobj\| | 6.96 | 7.22 | 5.76 |
| θgF(tobj) | 0.5540 | 0.4277 | 0.4387 |
| θgF(img) | 0.7511 | 0.4812 | 0.4830 |
| \|θgF(tobj) − θgF(timg)\| | 0.1971 | 0.0534 | 0.0443 |
| vdgiA(timg) | 7.861 | 2.831 | 2.836 |
| θgdgi(timg) | 1.6957 | 0.9549 | 0.9430 |
| θgFgi(timg) | 0.9365 | 0.3557 | 0.3477 |
| θgFgi(pmingi) | 0.9371 | 0.3555 | 0.3475 |
| \|θgFgi(pmaxgi) − θgFgi(pmingi)\| | 0.0006 | 0.0002 | 0.0002 |
| Δθgd(timg) | 0.2822 | −0.4888 | −0.5007 |
| ΔθgF(timg) | 0.2500 | −0.3565 | −0.3645 |
| \|ΔθgFs − ΔθgFm\| | 0.2037 | 0.4058 | 0.4183 |

Eleventh Embodiment

Figure 22:
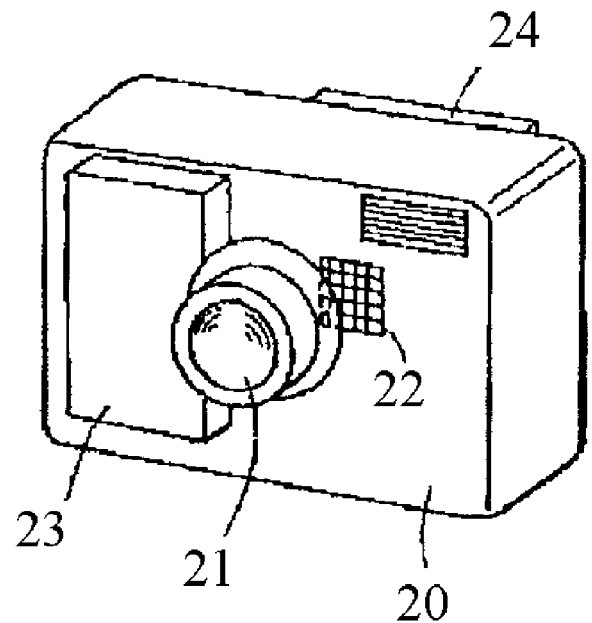
FIG. 22 is a schematic view of an image pickup apparatus according to an eleventh embodiment of the present invention.

Referring now to FIG. 22, a description will be given of a digital still camera (optical apparatus) that uses an optical system illustrated in each of the above embodiments for an image pickup optical system.

In FIG. 22, reference numeral 20 denotes a camera body. Reference numeral 21 denotes an image pickup optical system including the optical system described in each embodiment. Reference numeral 22 denotes a solid-state image sensing device (photoelectric conversion element), such as a CCD sensor and a CMOS sensor, provided in the camera body 20 and configured to photoelectrically convert an object image formed by the image pickup optical system 21.

Reference numeral 23 denotes a memory configured to record image information corresponding to the object image photoelectrically converted by the solid-state image sensing device 22. Reference numeral 24 is a viewfinder, such as a liquid crystal display panel, used to observe the object image (or image information) formed on the solid-state image sensing device 22.

A small camera with high optical performance can be implemented by applying an optical system of each embodiment to a digital still camera.

The present invention can provide an optical element having a refractive index distribution that can well correct a variety of aberrations, and an optical apparatus having the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-221630, filed Sep. 25, 2009 which is hereby incorporated by reference herein in its entirety.

What is claimed is:

1. An optical element comprising a medium having a refractive index distribution,
wherein the following conditions are met:

$$|\theta gF(pmax) - \theta gF(pmin)| \geq 0.02$$

$$|\Delta \theta gFgi(p1)| \geq 0.0272$$

$$|\Delta \theta gdgi(p1)| \geq 0.0250$$

$$|\theta gFgi(pmaxgi) - \theta gFgi(pmingi)| \leq 0.1$$

where θgF(pmax) is a partial dispersion ratio for g line and F line at a position pmax in the medium, θgF(pmin) is a partial dispersion ratio for the g line and the F line at a position pmin in the medium, the position pmax in the medium is a position that maximizes the partial dispersion ratio for the g line and the F line, the position pmin in the medium is a position that minimizes the partial dispersion ratio for the g line and the F line,
wherein the following conditions are met:

$$\delta ng(p1) = ng(p1) - ng(p0)$$

$$\delta nd(p1) = nd(p1) - nd(p0)$$

$$\delta nF(p1) = nF(p1) - nF(p0)$$

$$\delta nC(p1) = nC(p1) - nC(p0)$$

$$\theta gFgi(p1) = \{\delta ng(p1) - \delta nF(p1)\}/\{\delta nF(p1) - \delta nC(p1)\}$$

$$\theta gdgi(p1) = \{\delta ng(p1) - \delta nd(p1)\}/\{\delta nF(p1) - \delta nC(p1)\}$$

where P0 is a position in the medium having a reference refractive index, p1 is a position in the medium different from the position p0, nF(p1) is a refractive index of the medium for the F line at the position p1, nd(p1) is a refractive index of the medium for d line at the position p1, nC(p1) is a refractive index of the medium for C line at the position p1, nF(p0) is a refractive index of the medium for the F line at the position p0, nd(p0) is a refractive index of the medium for the d line at the position p0, nC(p0) is a refractive index of the medium for the C line at the position p0, δng(p1) is a refractive index difference for the g line at the position p1, δnF(p1) is a refractive index difference for the F line at the position p1, δnd(p1) is a refractive index difference for the d line at the position p1, δnC(p1) is a refractive index difference for the C line at the position p1, θgFgi(p1) is an equivalent partial dispersion ratio for the g line and the F line in the medium at the position p1, and θgdgi(p1) is an equivalent partial dispersion ratio for the g line and the d line in the medium at the position p1,
wherein the following conditions are met:

$$\Delta \theta gFgi(p1) = \theta gFgi(p1) - \theta gFgi0$$

$$\Delta \theta gdgi(p1) = \theta gdgi(p1) - \theta gdgi0$$

where ΔθgFgi(p1) is an anomalous dispersion of the equivalent partial dispersion ratio θgFgi(p1), Δθgdgi(p1) is an anomalous dispersion of the equivalent partial dispersion ratio θgdgi(p1), vdgi(p1) is an equivalent Abbe number for the d line and the g line at the position p1 in the medium, $\theta gFgi0 = -1.665 \times 10^{-7} vdgi(p1)^3 + 5.213 \times 10^{-5} vdgi(p1)^2 - $ $5.656\times10^{-3}$vdgi(p1)+0.7278, and θgdgi0=−1.687×10⁻⁷vdgi(p1)³+5.702×10⁻⁵vdgi(p1)²−6.603×10⁻³vdgi(p1)+1.462, wherein θgFgi(pmaxgi) is the equivalent partial dispersion ratio at a position pmaxgi in the medium, and θgFgi(pmingi) is the equivalent partial dispersion ratio at a position pmingi in the medium, and wherein the position pmaxgi is a position that is located in the medium different from the position p0, and maximizes the equivalent partial dispersion ratio for the g line and the F line, and the position pmingi is a position that is located in the medium different from the position p0, and minimizes the equivalent partial dispersion ratio for the g line and the F line.

2. The optical element according to claim 1, wherein the medium is a mixture obtained by mixing a solid-state material with at least one optical material, and wherein a composition ratio between the solid-state material and the optical material spatially distributes and satisfies the following conditions:

$|\Delta\theta gFs-\Delta\theta gFm|\geq 0.027$ where $\Delta\theta gFs$ is an anomalous dispersion of the solid-state material for the g line and F line, and $\Delta\theta gFm$ is an anomalous dispersion of the optical material for the g line and F line.

3. An optical apparatus comprising an optical system that includes an optical element including a medium having a refractive index distribution, wherein the following conditions are met:

$|\theta gF(pmax)-\theta gF(pmin)|\geq 0.02$ $|\Delta\theta gFgi(p1)|\geq 0.0272$ $|\Delta\theta gdgi(p1)|\geq 0.0250$ $|\theta gFgi(pmaxgi)-\theta gFgi(pmingi)|\leq 0.1$ where θgF(pmax) is a partial dispersion ratio for g line and F line at a position pmax in the medium, θgF(pmin) is a partial dispersion ratio for the g line and the F line at a position pmin in the medium, the position pmax in the medium is a position that maximizes the partial dispersion ratio for the g line and the F line, the position pmin in the medium is a position that minimizes the partial dispersion ratio for the g line and the F line, wherein the following conditions are met:

$\delta ng(p1)=ng(p1)-ng(p0)$ $\delta nd(p1)=nd(p1)-nd(p0)$ $\delta nF(p1)=nF(p1)-nF(p0)$ $\delta nC(p1)=nC(p1)-nC(p0)$ $\theta gFgi(p1)=\{\delta ng(p1)-\delta nF(p1)\}/\{\delta nF(p1)-\delta nC(p1)\}$ $\theta gdgi(p1)=\{\delta ng(p1)-\delta nd(p1)\}/\{\delta nF(p1)-\delta nC(p1)\}$ where P0 is a position in the medium having a reference refractive index, p1 is a position in the medium different from the position p0, nF(p1) is a refractive index of the medium for the F line at the position p1, nd(p1) is a refractive index of the medium for d line at the position p1, nC(p1) is a refractive index of the medium for C line at the position p1, nF(p0) is a refractive index of the medium for the F line at the position p0, nd(p0) is a refractive index of the medium for the d line at the position p0, nC(p0) is a refractive index of the medium for the C line at the position p0, δng(p1) is a refractive index difference for the g line at the position p1, δnF(p1) is a refractive index difference for the F line at the position p1, δnd(p1) is a refractive index difference for the d line at the position p1, δnC(p1) is a refractive index difference for the C line at the position p1, θgFgi(p1) is an equivalent partial dispersion ratio for the g line and the F line in the medium at the position p1, and θgdgi(p1) is an equivalent partial dispersion ratio for the g line and the d line in the medium at the position p1, wherein the following conditions are met:

$\Delta\theta gFgi(p1)=\theta gFgi(p1)-\theta gFgi0$ $\Delta\theta gdgi(p1)=\theta gdgi(p1)-\theta gdgi0$ where $\Delta\theta gFgi(p1)$ is an anomalous dispersion of the equivalent partial dispersion ratio θgFgi(p1), $\Delta\theta gdgi(p1)$ is an anomalous dispersion of the equivalent partial dispersion ratio θgdgi(p1), vdgi(p1) is an equivalent Abbe number for the d line and the g line at the position p1 in the medium, θgFgi0=−1.665×10⁻⁷vdgi(p1)³+5.213×10⁻⁵vdgi(p1)²−5.656×10⁻³vdgi(p1) +0.7278, and θgdgi0=−1.687×10⁻⁷vdgi(p1)³+5.702×10⁻⁵vdgi(p1)²−6.603×10⁻³vdgi(p1)+1.462, wherein θgFgi(pmaxgi) is the equivalent partial dispersion ratio at a position pmaxgi in the medium, and θgFgi(pmingi) is the equivalent partial dispersion ratio at a position pmingi in the medium, and wherein the position pmaxgi is a position that is located in the medium different from the position p0, and maximizes the equivalent partial dispersion ratio for the g line and the F line, and the position pmingi is a position that is located in the medium different from the position p0, and minimizes the equivalent partial dispersion ratio for the g line and the F line.

4. The optical apparatus according to claim 3, wherein the following condition is met for the condition |θgF(pmax)−θgF(pmin)|≧0.02:

$|\theta gFR(rea)-\theta gFR(0)|\geq 0.02$ where rea is a light effective radius of the optical element in the optical system, θgFR(rea) is a partial dispersion ratio of the medium for the g line and the F line at a distance rea from an optical axis in a direction orthogonal to the optical axis, and θgFR(0) is a partial dispersion ratio of the medium for the g line and the F line at a distance of 0 from the optical axis in the direction orthogonal to the optical axis.

5. The optical apparatus according to claim 3, wherein the following condition is met for the condition |θgF(pmax)−θgF(pmin)|≦0.02:

$|\theta gFA(tobj)-\theta gFA(timg)|\geq 0.02$ where tobj is a point closest to a light incident side in the optical system in an optical axis direction, timg is a point closest to a light exit side in the optical system in the optical axis direction, θgFA(tobj) is a partial dispersion ratio of the medium for the g line and the F line at the point tobj in the optical axis direction, and θgFA(timg) is a partial dispersion ratio of the medium for the g line and the F line at the point timg in the optical axis direction.

* * * * *